United States Patent
Fukuda et al.

(10) Patent No.: US 12,065,191 B2
(45) Date of Patent: Aug. 20, 2024

(54) WORKING MACHINE

(71) Applicant: KUBOTA CORPORATION, Osaka (JP)

(72) Inventors: Yuji Fukuda, Osaka (JP); Kohei Nagao, Osaka (JP)

(73) Assignee: KUBOTA CORPORATION, Osaka (JP)

(*) Notice: Subject to any disclaimer, the term of this patent is extended or adjusted under 35 U.S.C. 154(b) by 621 days.

(21) Appl. No.: 17/357,608

(22) Filed: Jun. 24, 2021

(65) Prior Publication Data
US 2022/0049468 A1 Feb. 17, 2022

(30) Foreign Application Priority Data

Aug. 15, 2020 (JP) .................. 2020-137176
Aug. 15, 2020 (JP) .................. 2020-137177
Mar. 25, 2021 (JP) .................. 2021-051889

(51) Int. Cl.
B62D 11/04 (2006.01)
E02F 3/34 (2006.01)
E02F 9/20 (2006.01)
E02F 9/22 (2006.01)
F15B 15/02 (2006.01)
F16H 61/47 (2010.01)

(52) U.S. Cl.
CPC ............ B62D 11/04 (2013.01); E02F 3/3414 (2013.01); E02F 9/2004 (2013.01); E02F 9/2235 (2013.01); E02F 9/2253 (2013.01); E02F 9/2292 (2013.01); E02F 9/2296 (2013.01); F15B 15/02 (2013.01); F16H 61/47 (2013.01)

(58) Field of Classification Search
CPC ...................................................... B62D 11/04
See application file for complete search history.

(56) References Cited

U.S. PATENT DOCUMENTS

| | | | |
|---|---|---|---|
| 11,873,624 B2* | 1/2024 | Fukuda | ............ F15B 15/00 |
| 2022/0049469 A1* | 2/2022 | Fukuda | ............ E02F 9/2292 |
| 2022/0196147 A1* | 6/2022 | Gono | ............ F04B 1/295 |

FOREIGN PATENT DOCUMENTS

JP    2017-179923 A    10/2017

* cited by examiner

Primary Examiner — Kevin Hurley
(74) Attorney, Agent, or Firm — GREENBLUM & BERNSTEIN, P.L.C.

(57) ABSTRACT

A working machine includes a first rotation detector to detect a first rotation speed of the left traveling motor, a second rotation detector to detect a second rotation speed of the right traveling motor, and a controller to perform automatic deceleration to automatically reduce the first rotation speed and the second rotation speed both set at respective second speed stages by shifting a speed stage of each of the first rotation speed and the second rotation speed to a first speed stage that is lower than the second speed stage. During straight traveling of a machine body of the working machine, the controller determines a straight-traveling threshold serving as a deceleration threshold for judging whether to perform the automatic deceleration based on the first rotation speed or the second rotation speed.

20 Claims, 15 Drawing Sheets

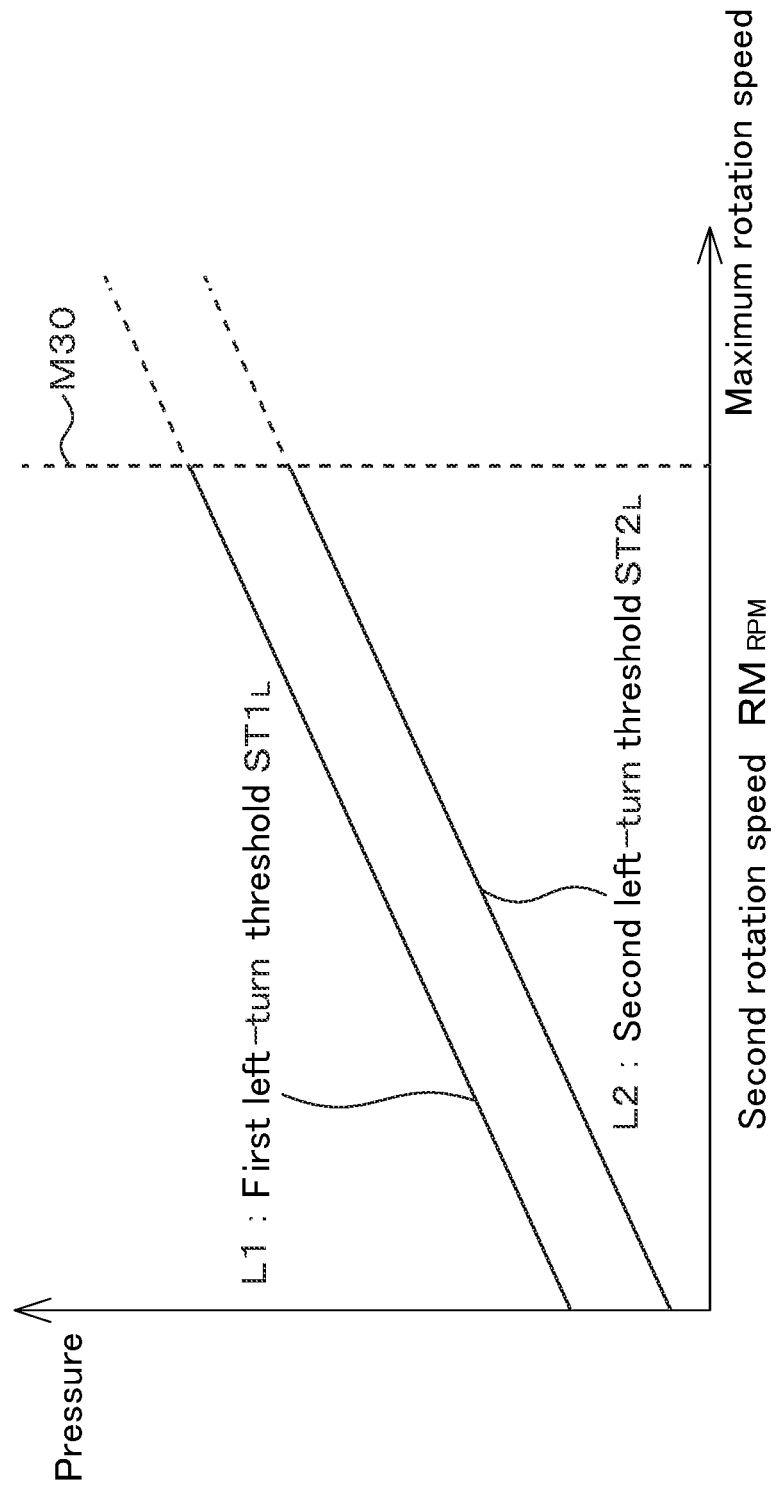

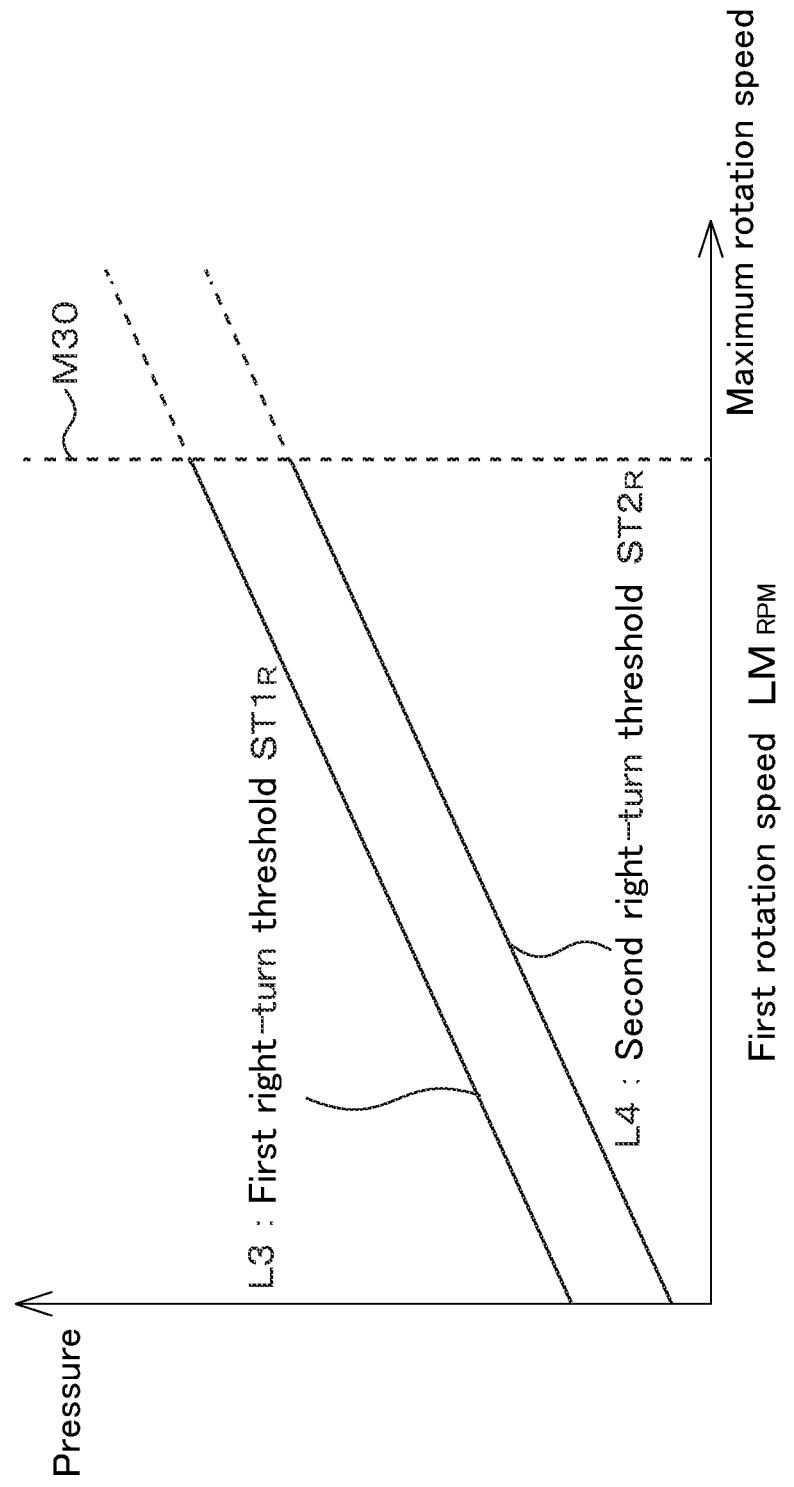

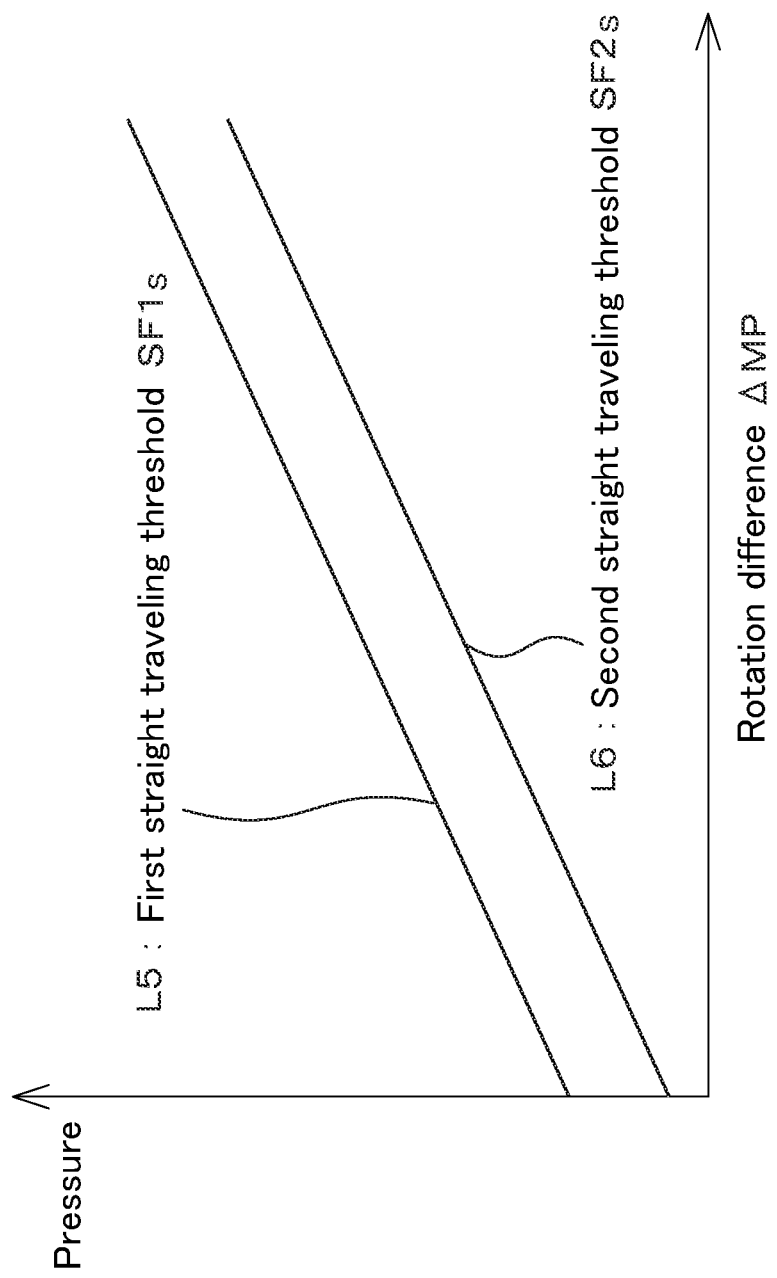

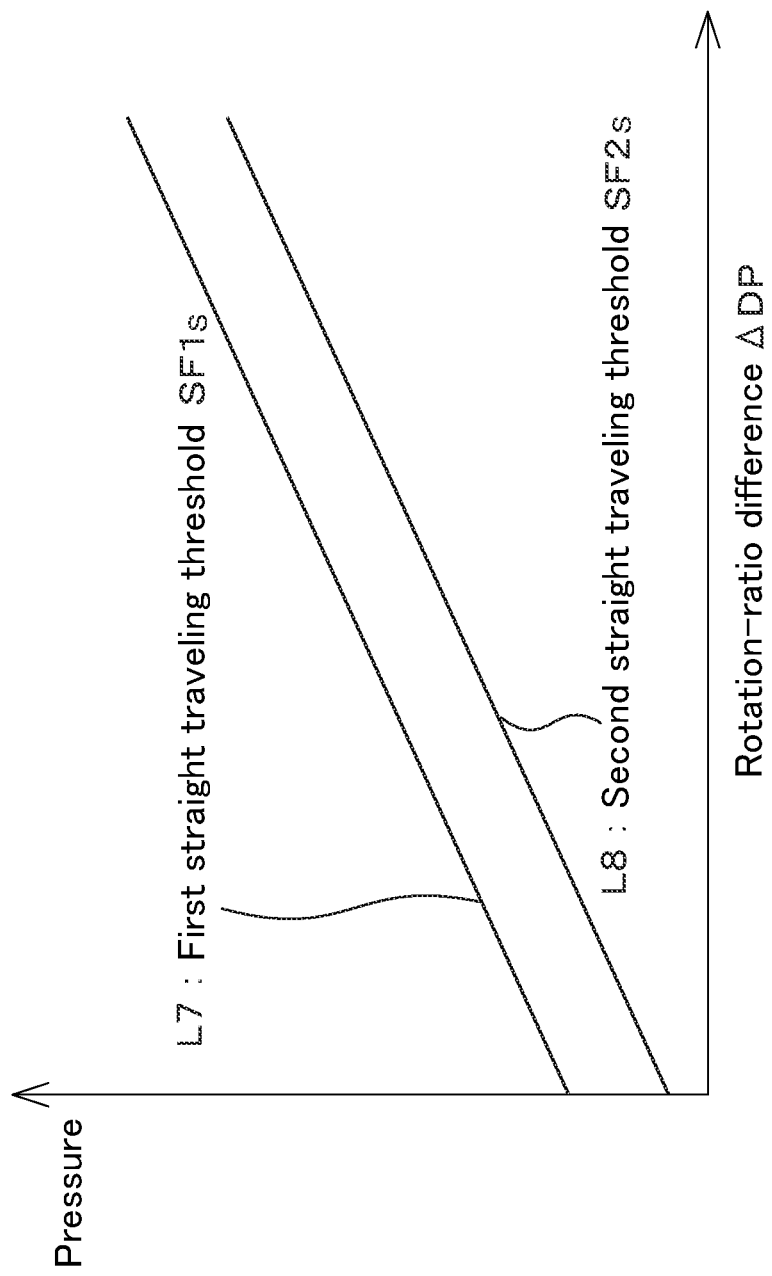

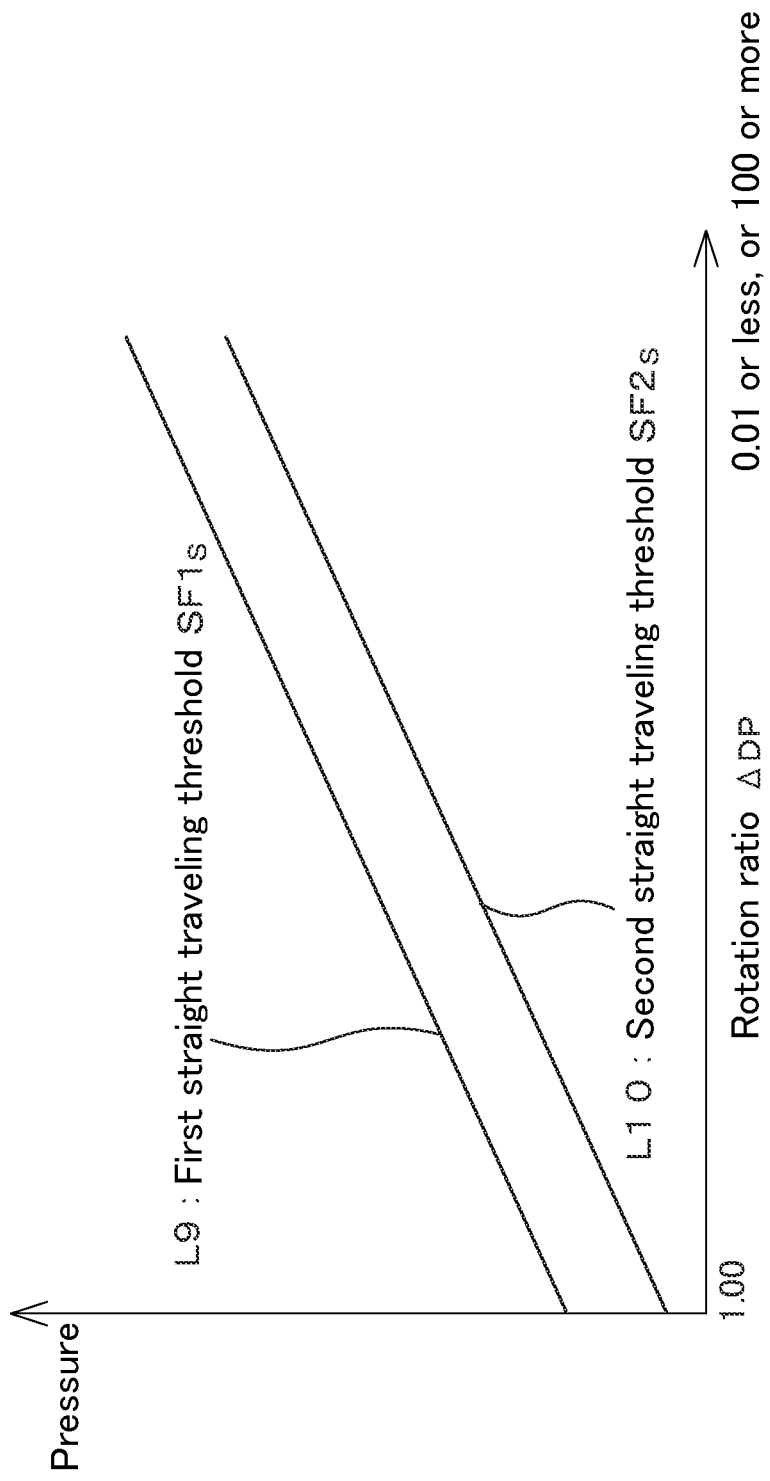

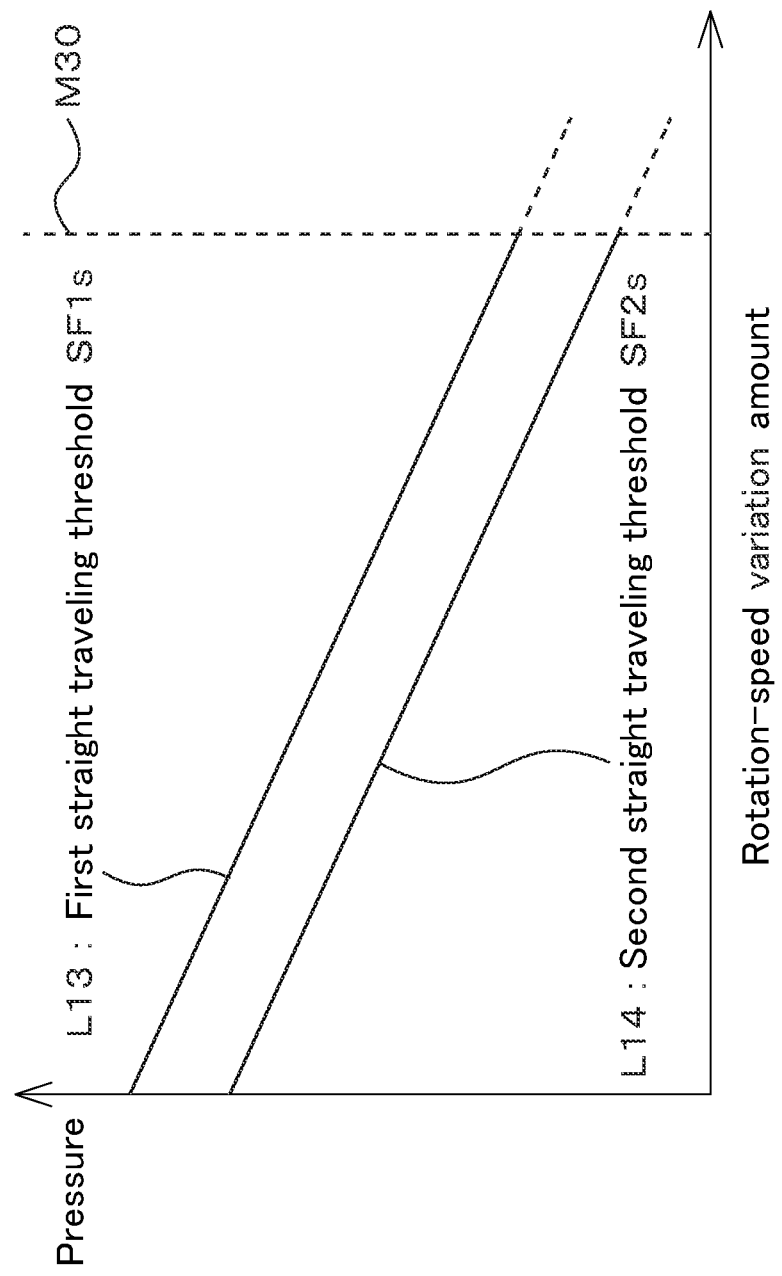

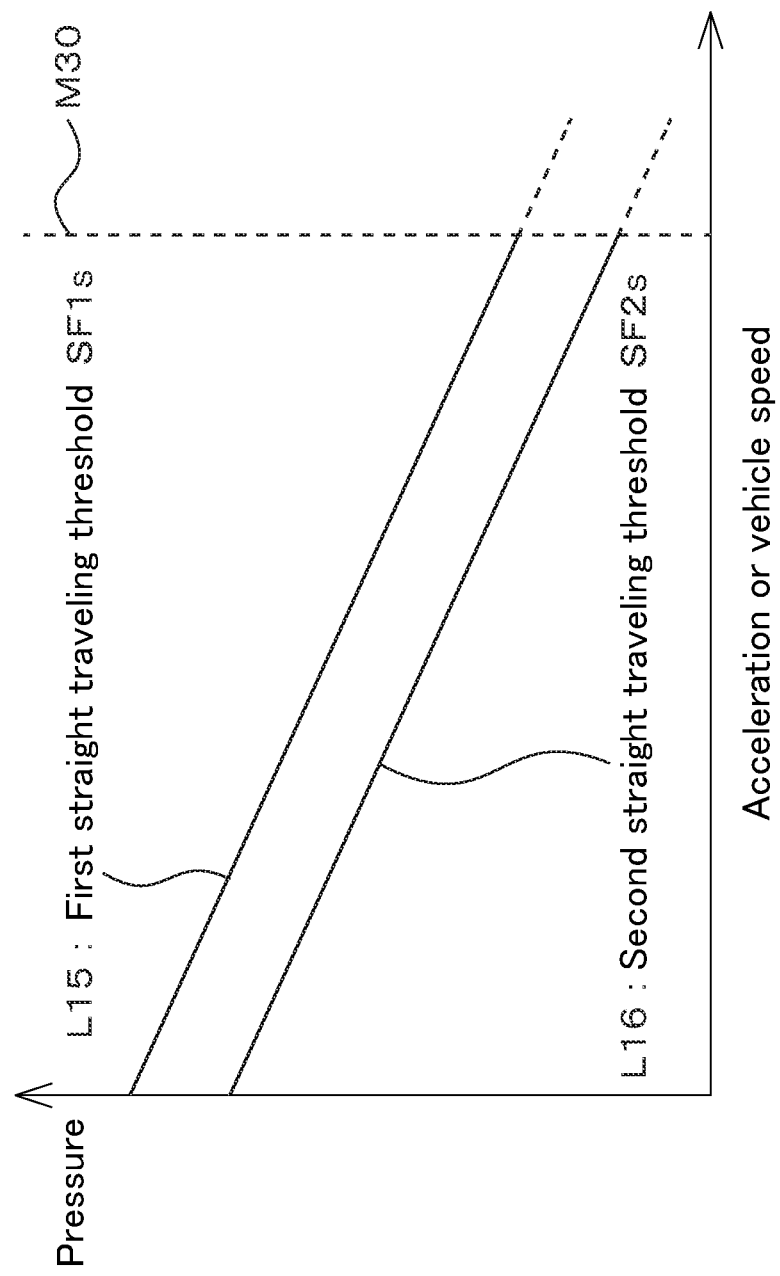

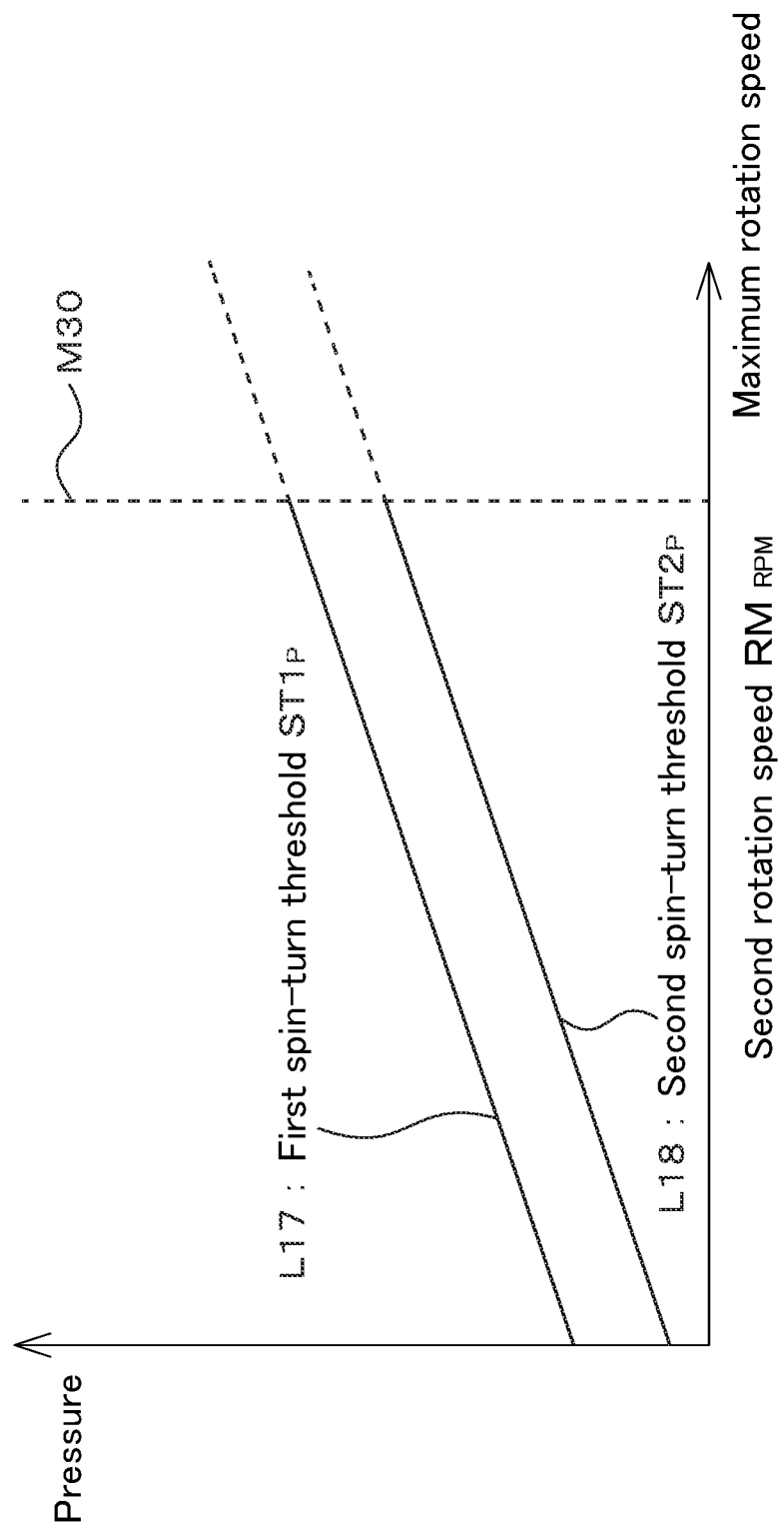

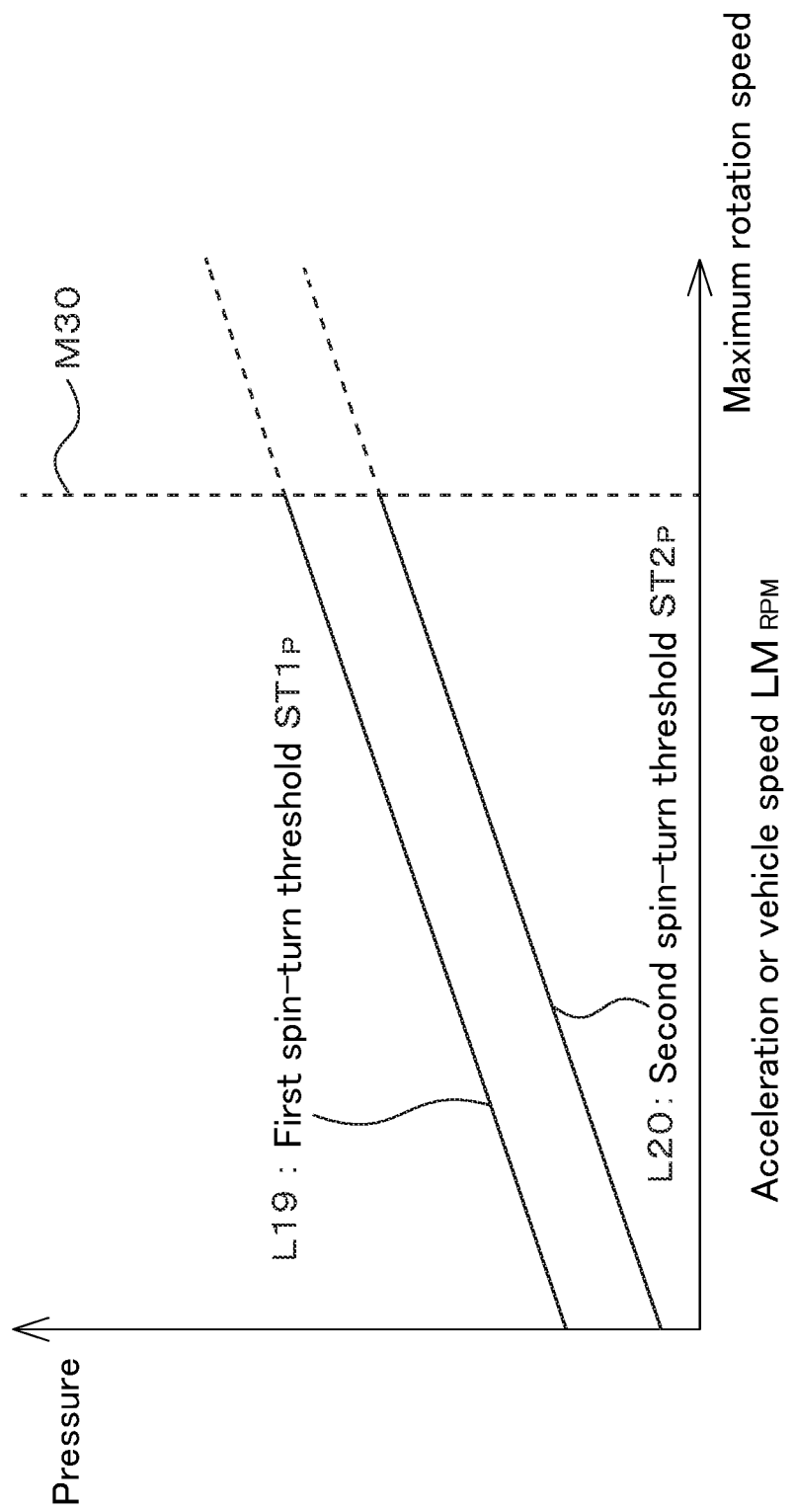

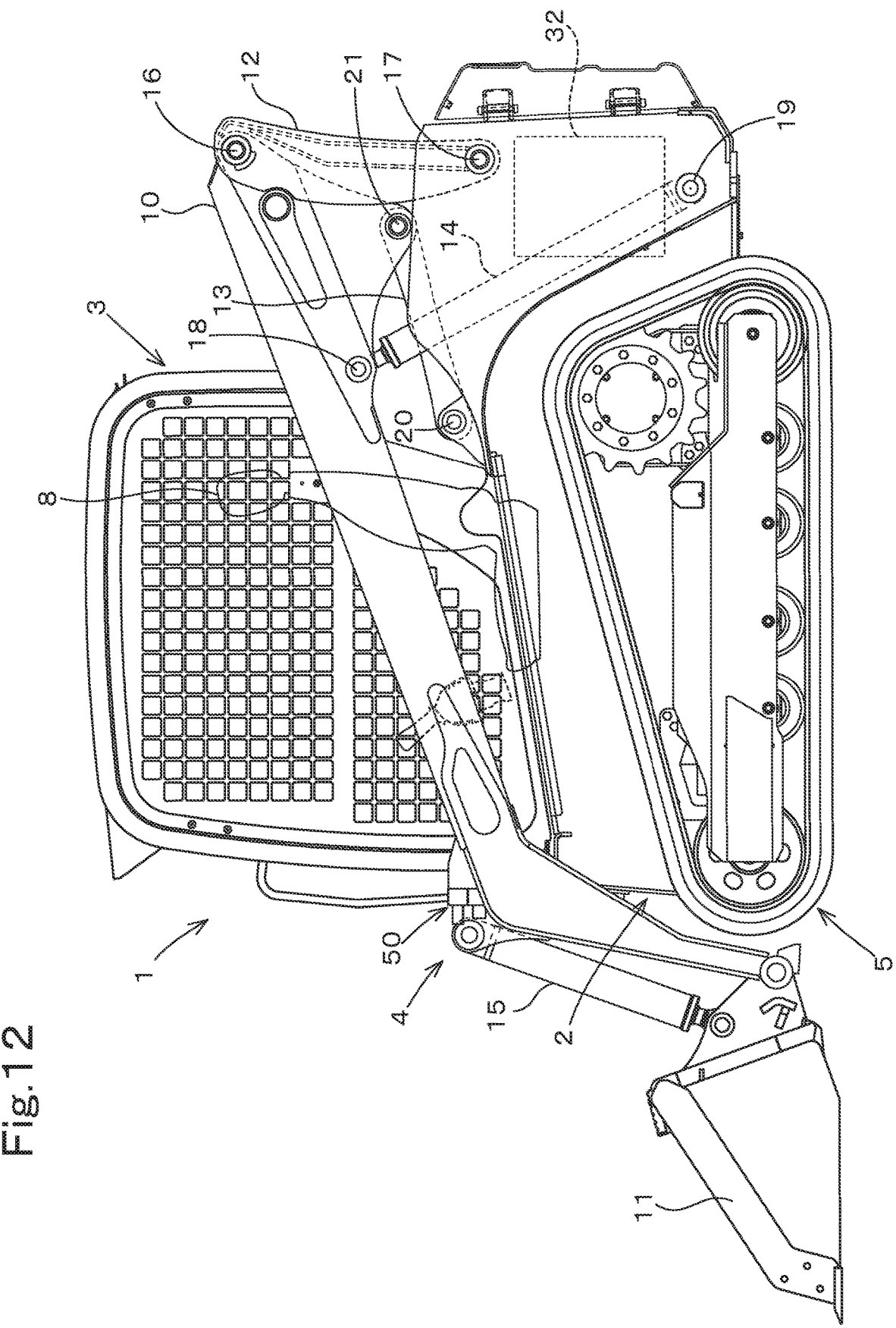

WORKING MACHINE

CROSS-REFERENCE TO RELATED APPLICATIONS

This application claims the benefit of priority to Japanese Patent Application No. 2020-137176 filed on Aug. 15, 2020, Japanese Patent Application No. 2020-137177 filed on Aug. 15, 2020, and Japanese Patent Application No. 2021-051889 filed on Mar. 25, 2021. The entire contents of these applications are hereby incorporated herein by reference.

BACKGROUND OF THE INVENTION

1. Field of the Invention

The present invention relates to a working machine such as a skid steer loader, a compact track loader, and a backhoe.

2. Description of the Related Art

Japanese unexamined patent application publication No. 2017-179923 discloses a technique for decelerating and accelerating a working machine. The working machine described in Japanese unexamined patent application publication No. 2017-179923 has a prime mover including an engine, a hydraulic pump configured to be operated by power of the prime mover and to output an operation fluid, a traveling hydraulic device configured to switch a speed stage between a first speed stage and a second speed stage that is faster than the first speed stage according to a pressure of the operation fluid, an operation valve configured to change the pressure of the operation fluid applied to the traveling hydraulic device, and a measurement device configured to detect the pressure of the operation fluid. When a detected pressure, which is a pressure of the operation fluid detected by the measurement device, drops from a set pressure corresponding to the second speed stage to a predetermined pressure or lower, the operation valve reduces the pressure of the operation fluid applied to the traveling hydraulic device to decelerate the traveling hydraulic device to the first speed stage.

SUMMARY OF THE INVENTION

A more complete appreciation of preferred embodiments of the present invention and many of the attendant advantages thereof will be readily obtained as the same becomes better understood by reference to the following detailed description when considered in connection with the accompanying drawings described below.

In a first aspect of the present invention, a working machine includes a machine body, a left traveling device provided on a left portion of the machine body, a right traveling device provided on a right portion of the machine body, a left traveling motor to output a power to the left traveling device, a right traveling motor to output a power to the right traveling device, a first rotation detector to detect a first rotation speed that is a rotation speed of the left traveling motor, a second rotation detector to detect a second rotation speed that is a rotation speed of the right traveling motor, a left traveling pump to supply operation fluid to the left traveling motor, a right traveling pump to supply operation fluid to the right traveling motor, a traveling operation device to operate at least one of the left traveling pump and the right traveling pump, and a controller to perform, when the first rotation speed and the second rotation speed are set at a second speed stage, automatic deceleration to automatically reduce the first rotation speed and the second rotation speed to a first speed stage lower than the second speed stage. During straight traveling of the machine body, the controller determines a straight-traveling threshold serving as a deceleration threshold for judging whether to perform the automatic deceleration based on the first rotation speed detected by the first rotation detector or the second rotation speed detected by the second rotation detector.

The controller determines the straight-traveling threshold which becomes higher as the first rotation speed or the second rotation speed increases, and which becomes lower as the first rotation speed or the second rotation speed decreases.

The working machine includes a first circulation fluid line connecting the left traveling pump to the left traveling motor and including a portion connected to a first port of the left traveling motor and another portion connected to a second port of the left traveling motor, a second circulation fluid line connecting the right traveling pump to the right traveling motor and including a portion connected to a third port of the right traveling motor and another portion connected to a fourth port of the right traveling motor, a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating, a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating, a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating, and a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating. During straight forward traveling of the machine body, the controller performs the automatic deceleration when both the first traveling pressure and the third traveling pressure are each kept equal to or higher than the straight-traveling threshold for a first judgment time or longer.

The controller determines the first judgment time which becomes shorter as the first rotation speed or the second rotation speed increases, and which becomes longer as the first rotation speed or the second rotation speed decreases.

During straight forward traveling of the machine body, the controller performs the automatic deceleration when both a first differential pressure obtained by subtracting the second traveling pressure from the first traveling pressure and a third differential pressure obtained by subtracting the fourth traveling pressure from the third traveling pressure are each kept equal to or higher than the straight-traveling threshold for a second judgment time or longer.

The controller determines the second judgment time which becomes shorter as the first rotation speed or the second rotation speed increases, and which becomes longer as the first rotation speed or the second rotation speed decreases.

The controller does not perform the automatic deceleration when a traveling operation member included in the traveling operation device is operated in a direction for forward traveling of the machine body and the left traveling motor and the right traveling motor rotate in respective directions for backward traveling of the machine body.

The controller does not perform the automatic deceleration when the first rotation speed or the second rotation speed is equal to or more than a predetermined speed.

The controller does not perform the automatic deceleration when the first rotation speed of the left traveling motor is equal to or higher than a first maximum rotation speed of the left traveling motor set at the first speed stage or when the second rotation speed of the right traveling motor is equal to or higher than a second maximum rotation speed of the right traveling motor set at the first speed stage.

The controller determines the straight-traveling threshold when a traveling operation member included in the traveling operation device is operated in a direction for straight traveling of the machine body.

In a second aspect of the present invention, a working machine includes a machine body, a left traveling device provided on a left portion of the machine body, a right traveling device provided on a right portion of the machine body, a left traveling motor to output a power to the left traveling device, a right traveling motor to output a power to the right traveling device, a first rotation detector to detect a first rotation speed that is a rotation speed of the left traveling motor, a second rotation detector to detect a second rotation speed that is a rotation speed of the right traveling motor, a left traveling pump to supply operation fluid to the left traveling motor, a right traveling pump to supply operation fluid to the right traveling motor, a traveling operation device to operate at least one of the left traveling pump and the right traveling pump, and a controller to perform, when the first rotation speed and the second rotation speed are set at a second speed stage, automatic deceleration to automatically reduce the first rotation speed and the second rotation speed to a first speed stage lower than the second speed stage. During straight traveling of the machine body, the controller determines a straight-traveling threshold serving as a deceleration threshold for judging whether to perform the automatic deceleration based on a rotation difference or rotation ratio between the first rotation speed and the second rotation speed.

The controller determines the straight-traveling threshold which becomes higher as the rotation difference increases, and which becomes lower as the rotation difference decreases.

The controller determines the straight-traveling threshold which becomes higher as the rotation ratio increases, and which becomes lower as the rotation ratio decreases.

The controller determines the straight-traveling threshold which becomes higher as a difference (a difference in rotation ratio) between a first ratio obtained by dividing the second rotation speed by the first rotation speed and a second ratio obtained by dividing the first rotation speed by the second rotation speed becomes larger, and which becomes lower as the difference between the first ratio and the second ratio becomes smaller.

The working machine includes a first circulation fluid line connecting the left traveling pump to the left traveling motor and including a portion connected to a first port of the left traveling motor and another portion connected to a second port of the left traveling motor, a second circulation fluid line connecting the right traveling pump to the right traveling motor and including a portion connected to a third port of the right traveling motor and another portion connected to a fourth port of the right traveling motor, a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating, a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating, a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating, and a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating. During straight forward traveling of the machine body, the controller performs the automatic deceleration when either one of the first traveling pressure and the third traveling pressure is equal to or more than the straight-traveling threshold.

During straight forward traveling of the machine body, the controller performs the automatic deceleration when either one of a first differential pressure obtained by subtracting the second traveling pressure from the first traveling pressure and a third differential pressure obtained by subtracting the fourth traveling pressure from the third traveling pressure is equal to or more than the straight-traveling threshold.

The above and other elements, features, steps, characteristics and advantages of the present invention will become more apparent from the following detailed description of the preferred embodiments with reference to the attached drawings.

BRIEF DESCRIPTION OF THE DRAWINGS

The preferred embodiments will now be described with reference to the accompanying drawings, wherein like reference numerals designate corresponding or identical elements throughout the various drawings. The drawings are to be viewed in an orientation in which the reference numerals are viewed correctly.

FIG. 3 is a view showing a relationship between a second rotation speed $LM_{RPM}$, a first left-turn threshold $ST1_L$, a second left-turn threshold $ST2_L$.

FIG. 4 is a view showing a relationship between a first rotation speed $LM_{RPM}$, a first right-turn threshold $ST1_R$, a second right-turn threshold $ST2_R$.

FIG. 5 is a view showing a relationship between a rotation difference $\Delta MP$, a first straight threshold $SF1_S$, and a second straight threshold $SF2_S$.

FIG. 6A is a view showing a relationship between a rotation-ratio difference ΔDP, the first straight threshold $SF1_S$, and the second straight threshold $SF2_S$.

FIG. 6B is a view showing a relationship between a rotation ratio ΔDQ, the first straight threshold $SF1_S$, and the second straight threshold $SF2_S$.

FIG. 10A is a view showing a relationship between a rotation speed change, the first straight threshold $SF1_S$, and the second straight threshold $SF2_S$.

FIG. 10B is a view showing a relationship between an acceleration or vehicle speed, the first straight threshold $SF1_S$, and the second straight threshold $SF2_S$.

FIG. 11A is a view showing a relationship between a second rotation speed $RM_{RPM}$, the first spin-turn threshold $ST1_P$, and the second spin-turn threshold $ST2_P$.

FIG. 11B is a view showing a relationship between a first rotation speed $LM_{RPM}$, the first spin-turn threshold $ST1_P$, and the second spin-turn threshold $ST2_P$.

FIG. 12 is a side view showing a track loader that is an example of a working machine.

DETAILED DESCRIPTION OF THE PREFERRED EMBODIMENTS

Figure 1:
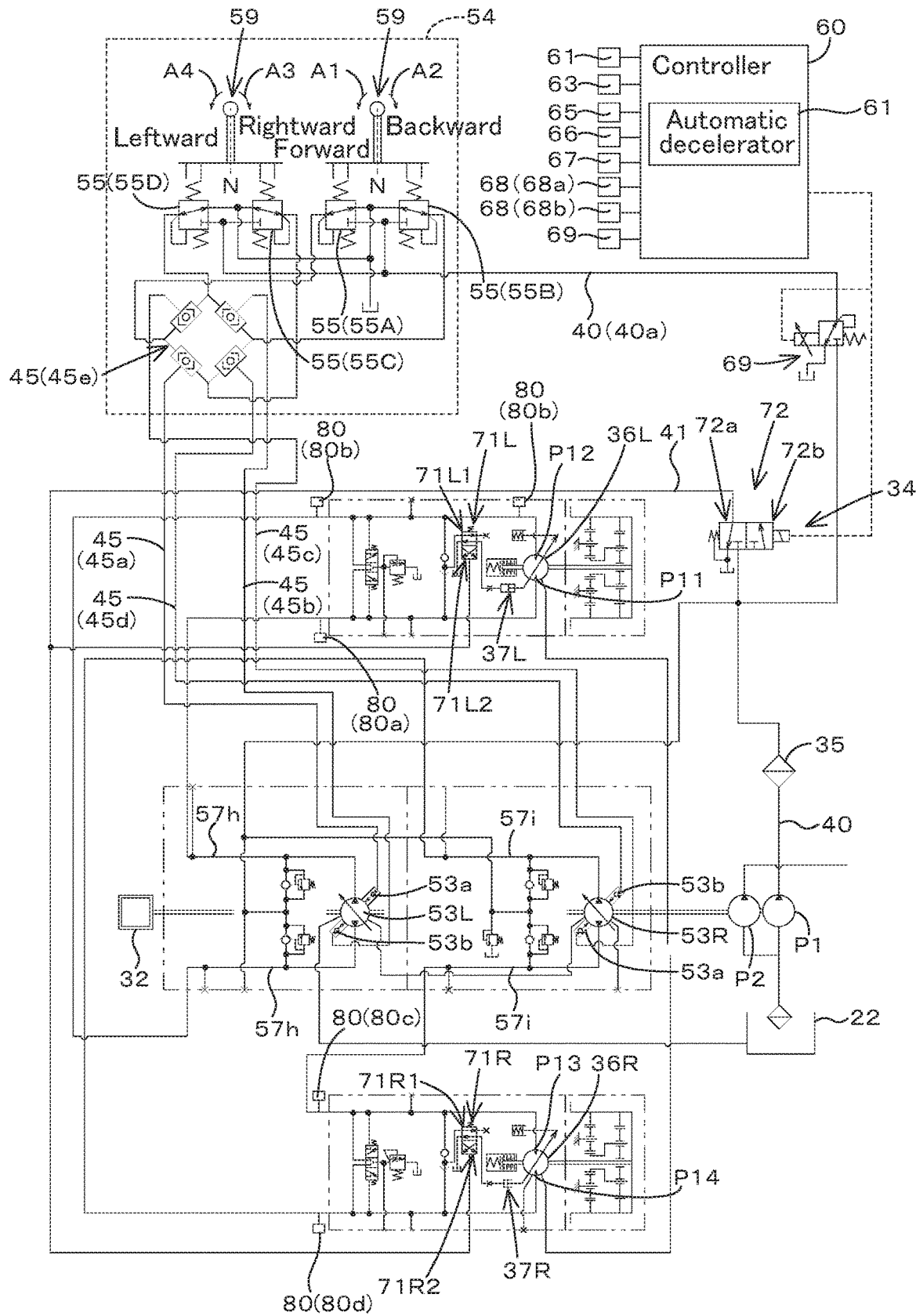
FIG. 1 is a view showing a hydraulic system (a hydraulic circuit) for working machine.

The above and other elements, features, steps, characteristics and advantages of the present invention will become more apparent from the following detailed description of the preferred embodiments with reference to the attached drawings.

With reference to drawings as appropriate, a preferred embodiment of a hydraulic system for a working machine and the working machine having the hydraulic system will be described below.

FIG. 12 shows a side view of a working machine 1 of the present invention. FIG. 12 shows a compact track loader as an example of the working machine 1. However, the working machine of the present invention is not limited to the compact track loader, but may be other types of loader working machines, such as a skid steer loader, for example. In addition, the working machine may be a working machine other than the loader working machine.

As shown in FIG. 12, a working machine 1 has a machine body 2, a cabin 3, a working device 4, and a pair of traveling devices 5L and 5R. In the embodiment of the present invention, a forward direction of a driver siting on a driver seat 8 of the working machine 1 (a left side in FIG. 12) is referred to as the front, a rearward direction of the driver (a right side in FIG. 12) is referred to as the rear, a leftward direction of the driver (a front surface side of FIG. 12) is referred to as the left, and a rightward direction of the driver (a back surface side of FIG. 12) is referred to as the right. A horizontal direction, which is orthogonal to a fore-and-aft direction, is referred to as a machine width direction. A direction from the center of the machine body 2 to the right or left is referred to as a machine outward direction. In other words, the machine outward direction is the machine width direction and separates away from the machine body 2. A direction opposite to the machine outward direction is referred to as a machine inward direction. In other words, the machine inward direction is the machine width direction and approaches the machine body 2.

The cabin 3 is mounted on the machine body 2. The cabin 3 has the driver seat 8. The working device 4 is attached to the machine body 2. A pair of traveling devices 5L and 5R are arranged on the outside of the machine body 2. A prime mover 32 is mounted inside a rear portion of the machine body 2.

The working device 4 has booms 10, a working tool 11, lift links 12, control links 13, boom cylinders 14, and bucket cylinders 15.

The booms 10 are arranged right and left beside the cabin 3 and pivotable up and down. The working tool 11 is, for example, a bucket. The bucket 11 is arranged at a tip portion (that is, a front end portion) of the boom 10 and freely moved up and down. The lift links 12 and the control links 13 support a base portion (that is, a rear portion) of the boom 10 so that the boom 10 can be freely swung up and down. The boom cylinders 14 are stretched and contracted to lift and lower the boom 10. The bucket cylinders 15 are stretched and contracted to swing the bucket 11 up and down.

Front portions of the right and left booms 10 are connected to each other by a deformed connecting pipe. Base portions (that is, rear portions) of the booms 10 are connected to each other by a circular connecting pipe.

Pairs of the lift link 12, control link 13, and boom cylinder 14 are arranged respectively right and left on the machine body 2, corresponding to the right and left booms 10.

The lift links 12 are provided vertically at rear portions of the base portions of the booms 10. Upper portions (that is, one ends) of the lift links 12 are supported turnably around a lateral axis by pivot shafts 16 (referred to as first pivot shafts) near the rear portions of the base portions of the booms 10. Lower portions (that is, the other ends) of the lift links 12 are supported turnably around the lateral axis by pivot shafts 17 (referred to as second pivot shafts) near the rear portion of the machine body 2. The second pivot shafts 17 are provided below the first pivot shafts 16.

Upper portions of the boom cylinders 14 are supported turnably around the lateral axis by pivot shafts 18 (referred to as third pivot shafts). The third pivot shafts 18 are provided at the base portions of the booms 10, that is, at front portions of the base portions. Lower portions of the boom cylinders 14 are supported turnably around the lateral axis by pivot shafts 19 (referred to as fourth pivot shafts). The fourth pivot shafts 19 are provided near a lower portion of the rear portion of the machine body 2 and below the third pivot shafts 18.

The control links 13 are provided in front of the lift links 12. One ends of the control links 13 are supported turnably around the lateral axis by pivot shafts 20 (referred to as fifth pivot shafts). The fifth pivot shafts 20 are provided, in the machine body 2, on positions forward of the lift links 12. The other ends of the control links 13 are supported turnably around the lateral axis by pivot shafts 21 (referred to as sixth pivot shafts). The sixth pivot shafts 21 are provided, in the boom 10, forward of and above the second pivot shafts 17.

By stretching and contracting the boom cylinders 14, the booms 10 is swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

Another working tool can be attached to the front portions of the booms 10 instead of the bucket 11. The other working tools are, for example, attachments (that is, auxiliary attachments) such as hydraulic crushers, hydraulic breakers, angle brooms, earth augers, pallet forks, sweepers, mowers, snow blowers, or the like.

A connector member 50 is provided at the front portion of the left boom 10. The connector member 50 is a device configured to connect a hydraulic equipment attached to the auxiliary attachment to a first piping member such as a pipe provided on the left boom 10. Specifically, the first piping member can be connected to one end of the connector member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are provided respectively near the front portions of the booms 10. The bucket cylinders 15 are stretched and contracted to swing the bucket 11.

Of the pair of traveling devices 5L and 5R, the traveling device 5L is provided on a left side of the machine body 2, and the traveling device 5R is provided on a right side of the machine body 2. In the embodiment, a crawler type (including a semi-crawler type) traveling device is adopted for the pair of traveling devices 5L and 5R. A wheel-type traveling device having front wheels and rear wheels may also be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, gasoline engine, an electric motor, or the like. In the embodiment, the prime mover 32 is the diesel engine, but is not limited thereto.

The hydraulic system for the working machine 1 will be described below.

As shown in FIG. 1, the hydraulic system for the working machine 1 has a first hydraulic pump P1 and a second hydraulic pump P2. The first hydraulic pump P1 is a pump to be driven by the power of prime mover 32 and is constituted of a constant displacement gear pump. The first hydraulic pump P1 is capable of outputting operation fluid stored in a tank 22. Specifically, the first hydraulic pump P1 discharges operation fluid that is mainly used for control. For convenience of explanation, the tank 22 that stores operation fluid may be referred to as an operation fluid tank. Of the operation fluid output from the first hydraulic pump P1, the operation fluid used for control is referred to as pilot fluid, and a pressure of the pilot fluid is referred to as a pilot pressure.

The second hydraulic pump P2 is a pump to be driven by the power of prime mover 32, and is constituted of a constant displacement gear pump. The second hydraulic pump P2 is capable of outputting operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The hydraulic system for the working machine 1 has a pair of traveling motors 36L and 36R and a pair of traveling pumps 53L and 53R. The pair of traveling motors 36L and 36R transmit power to the pair of traveling devices 5L and 5R. Of the pair of traveling motors 36L and 36R, the traveling motor 36L transmits rotational power to the traveling device (referred to as a left traveling device) 5L, and the traveling motor 36R transmits rotational power to the traveling device (referred to as a right traveling device) 5R.

The pair of traveling pumps 53L and 53R are pumps to be driven by the power of prime mover 32 and are, for example, variable displacement axial pumps of swash plate type. The pair of traveling pumps 53L and 53R are driven to supply operation fluid respectively to the pair of traveling motors 36L and 36R. Of the pair of traveling pumps 53L and 53R, the traveling pump 53L supplies the operation fluid to the traveling motor 36L, and the traveling pump 53R supplies the operation fluid to the traveling motor 36R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

The left traveling pump 53L and the right traveling pump 53R have a pressure-receiving portion 53a and a pressure-receiving portion 53b to which a pressure (that is, a pilot pressure) of the operation fluid (that is, pilot fluid) from the first hydraulic pump P1 is applied, and angles of the swash plates are changed by the pilot pressures applied to the pressure-receiving portions 53a and 53b. By changing the angles of the swash plates, outputs (that is, output rates of operation fluid) and output directions of operation fluid can be changed in the left traveling pump 53L and the right traveling pump 53R.

The left traveling pump 53L and the left traveling motor 36L are connected by a connecting fluid line 57h (referred to as a first circulation fluid line), and operation fluid output by the left traveling pump 53L is supplied to the left traveling motor 36L. The right traveling pump 53R and the right traveling motor 36R are connected by a connecting fluid line 57i (referred to as a second circulation fluid line), and the operation fluid output by the right traveling pump 53R is supplied to the right traveling motor 36R.

The left traveling motor 36L is capable of rotating, using operation fluid output from the left traveling pump 53L. By changing a flow rate of operation fluid to the left traveling motor 36L, a rotation speed (that is, a revolving speed) of the left traveling motor 36L can be changed. A swash plate switching cylinder 37L is connected to the left traveling motor 36L. By extending and contracting the swash plate switching cylinder 37L in one direction or the other direction, a rotation speed of the left traveling motor 36L can be changed. In this regard, when the swash plate switching cylinder 37L is contracted, the swash plate of the left traveling motor 36L is set at a low speed position so that the rotation speed of the left traveling motor 36L is set at a first speed stage defining a predetermined low speed range. When the swash plate switching cylinder 37L is extended, the swash plate of the left traveling motor 36L is set at a high speed position so that a rotation speed of the left traveling motor 36L is set at a second speed stage defining a predetermined high speed range. That is, a rotation speed of the left traveling motor 36L can be set at a speed stage shiftable between the first speed stage and the second speed stage.

The right traveling motor 36R is capable of rotating, using operation fluid output from the right traveling pump 53R. By changing a flow rate of operation fluid to the right traveling motor 36R, a rotation speed of the right traveling motor 36R can be changed. A swash plate switching cylinder 37R is connected to the right traveling motor 36R. By extending and contracting the swash plate switching cylinder 37R in one direction or the other direction, a rotation speed of the right traveling motor 36R can be changed. In this regard, when the swash plate switching cylinder 37R is contracted, the swash plate of the right traveling motor 36R is set at a low speed position so that the rotation speed of the right traveling motor 36R is set at a first speed stage defining a predetermined low speed range. When the swash plate switching cylinder 37R is extended, the swash plate of the right traveling motor 36R is set at a high speed position so that the rotation speed of the right traveling motor 36R is set at a second speed stage defining a predetermined high speed range. That is, a rotation speed of the right traveling motor 36R can be set at a speed stage shiftable between the first speed stage and the second speed stage.

As shown in FIG. 1, the hydraulic system for the working machine 1 has a traveling switching valve 34. The traveling switching valve 34 is shiftable between a first stage and a second stage to change a speed stage of rotation speed of each of the traveling motors 36L and 36R between the first speed stage and the second speed stage. The travel switching valve 34 is a valve assembly including first switching valves 71L and 71R and a second switching valve 72.

The first switching valve 71L is connected via a fluid line to the swash plate switching cylinder 37L of the left traveling motor 36L, and is constituted of a two-position switching valve configured to switch between a first position 71L1 and a second position 71L2. The first switching valve 71L contracts the swash plate switching cylinder 37L when in the first position 71L1, and stretches the swash plate switching cylinder 37L when in the second position 71L2.

The first switching valve 71R is connected via a fluid line to the swash plate switching cylinder 37R of the right traveling motor 36R, and is constituted of a two-position switching valve configured to switch between a first position 71R1 and a second position 71R2. The first switching valve 71R contracts the swash plate switching cylinder 37R when in the first position 71R1, and stretches the swash plate switching cylinder 37R when in the second position 71R2.

The second switching valve 72 is a solenoid valve that switches the first switching valve 71L and the first switching valve 71R, and is constituted of a two-position switching valve configured to be magnetized to switch between a first position 72a and a second position 72b. The second switching valve 72, the first switching valve 71L and the first switching valve 71R are connected by a fluid line 41. The second switching valve 72 switches the first switching valve 71L and the first switching valve 71R to the first positions 71L1 and 71R1 when in a first position 72a, and switches the first switching valve 71L and the first switching valve 71R to the second positions 71L2 and 71R2 when in a second position 72b.

When the second switching valve 72 is disposed at the first position 72a, the first switching valve 71L is disposed at the first position 71L1, and the first switching valve 71R is disposed at the first position 71R1, the traveling switching valve 34 is set in the first state to contract the swash plate switching cylinders 37L and 37R so as to set the rotation speed of each of the traveling motors 36L and 36R at the first speed stage. When the second switching valve 72 is disposed at the second position 72b, the first switching valve 71L is disposed at the second position 71L2, and the first switching valve 71R is disposed at the second position 71R2, the traveling switching valve 34 is set in the second state to extend the swash plate switching cylinders 37L and 37R so as to set the rotation speed of each of the traveling motors 36L and 36R at the second speed stage. Accordingly, the traveling switching valve 34 is operable to shift the speed stage of rotation speed of each of the traveling motors 36L and 36R between the first speed stage and the second speed stage.

An operation device (that is, a traveling operating device) 54 is configured to apply operation fluid to the pressure-receiving portions 53a and 53b of the traveling pumps 53L and 53R (that is, the left traveling pump 53L and the right traveling pump 53R) when a traveling operation member 59 is operated, and is capable of changing the angles of swash plates (referred to as swash plate angles) of the traveling pumps 53L and 53R. The operation device 54 includes the traveling operation member 59 and a plurality of operation valves 55.

The traveling operation member 59 is an operation lever that is supported by the operation valves 55 and swings in a lateral direction (that is, the machine width direction) or the fore-and-aft direction. That is, relative to a neutral position N, the traveling operation member 59 is operable to the right and to the left from a neutral position N, and to the front and to the rear from the neutral position N. In other words, the traveling operation member 59 is swingable in at least four directions with reference to the neutral position N. For convenience of explanation, the forward and backward directions, that is, the fore-and-aft direction, may be referred to as a first direction. The rightward and leftward directions, that is, the lateral direction (that is, the machine width direction), are may be referred to as a second direction.

The plurality of operation valves 55 are operated by the common, a single, traveling operation member 59. The plurality of operation valves 55 are actuated based on swinging of the traveling operation member 59. An output fluid line 40 is connected to the plurality of operation valves 55, and operation fluid (that is, pilot fluid) from the first hydraulic pump P1 can be supplied through the output fluid line 40. The plurality of operation valves 55 include an operation valve 55A, operation valve 55B, operation valve 55C, and operation valve 55D.

When the traveling operation member 59 is swung forward (that is, in one direction) in the fore-and-aft direction (that is, the first direction) (that is, when a forward operation of performed), the operation valve 55A changes a pressure of operation fluid output according to an operation extent (operation) of the forward operation. When the traveling operation member 59 is swung backward (that is, the first direction) (that is, in the other direction) in the fore-and-aft direction (that is, when a backward operation of performed), the operation valve 55B changes a pressure of operation fluid output according to an operation extent (operation) of the backward operation. When the traveling operation member 59 is swung rightward (that is, in one direction) in the lateral direction (that is, the second direction) (that is, when a rightward operation of performed), the operation valve 55C changes a pressure of operation fluid output according to an operation extent (operation) of the rightward operation. When the traveling operation member 59 is swung leftward (that is, in the other direction) in the lateral direction (that is, the second direction) (that is, when a leftward operation of performed), the operation valve 55D changes a pressure of operation fluid output according to an operation extent (operation) of the leftward operation.

The plurality of operation valves 55 and the traveling pumps 53L and 53R are connected by the traveling fluid line 45. In other words, the traveling pumps 53L and 53R are hydraulic equipment that are configured to be operated by operation fluid output from the operation valves 55 (that is, the operation valve 55A, operation valve 55B, operation valve 55C, and operation valve 55D).

The traveling fluid line 45 has a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a pressure-receiving portion 53a (referred to as a first pressure-receiving portion) of the left traveling pump 53L, and is a fluid line through which operation fluid applied to the pressure-receiving portion 53a (that is, the first pressure-receiving portion) flows when the traveling operation member 59 is operated. The second traveling fluid line 45b is a fluid line connected to a pressure-receiving portion 53b (referred to as a second pressure-receiving portion) of the left traveling pump 53L, and is a fluid line through which operation fluid applied to the pressure-receiving portion 53b (that is, the second pressure-receiving portion) flows when the traveling operation member 59 is operated. The third traveling fluid line 45c is a fluid line connected to a pressure-receiving portion 53a (referred to as a third pressure-receiving portion) of the right traveling pump 53R, and is a fluid line through which operation fluid applied to the pressure-receiving portion 53a (that is, the third pressure-receiving portion) flows when the traveling operation member 59 is operated. The fourth traveling fluid line 45d is a fluid line connected to a pressure-receiving portion 53b (referred to as a fourth pressure-receiving portion) of the right traveling pump 53R, and is a fluid line through which operation fluid applied to the pressure-receiving portion 53b (that is, the fourth pressure-receiving portion) flows when the traveling operation member 59 is operated. The fifth traveling fluid line 45e is a fluid line that connects the operation valves 55, the first traveling fluid line 45a, the second traveling fluid line 45b, the third traveling fluid line 45c, and the fourth traveling fluid line 45d.

A plurality of high-pressure selector valves 47a, 47b, 47c, and 47d are provided in the fifth traveling fluid line 45e. The plurality of high-pressure selector valves 47a, 47b, 47c, and 47d are connected to the first traveling fluid line 45a, the second traveling fluid line 45b, the third traveling fluid line 45c, and the fourth traveling fluid line 45d, and selectively supply operation fluid with higher one of pressures (that is, the pilot pressure).

When the traveling operation member 59 is swung forward (in a direction indicated by an arrowed line A1 in FIGS. 1 and 2), the operation valve 55A is operated and pilot pressure is output from the operation valve 55A. This pilot pressure is applied to the pressure-receiving portion 53a of the left traveling pump 53L via the first traveling fluid line 45a and to the pressure-receiving portion 53a of the right traveling pump 53R via the third traveling fluid line 45c. In this manner, the swash plate angles of the left traveling pump 53L and the right traveling pump 53R are changed, the left traveling motor 36L and the right traveling motor 36R rotate forwardly (referred to as forward rotation), and the working machine 1 travels straight forward.

When the traveling operation member 59 is swung backward (in a direction indicated by an arrowed line A2 in FIGS. 1 and 2), the operation valve 55B is operated and pilot pressure is output from the operation valve 55B. This pilot pressure is applied to the pressure-receiving portion 53b of the left traveling pump 53L via the second traveling fluid line 45b and to the pressure-receiving portion 53b of the right traveling pump 53R via the fourth traveling fluid line 45d. In this manner, the swash plate angles of the left traveling pump 53L and the right traveling pump 53R are changed, the left traveling motor 36L and the right traveling motor 36R rotate reversely (referred to as backward rotation), and the working machine 1 travels straight backward.

When the traveling control member 59 is swung to the right (in a direction indicated by an arrowed line A4 in FIGS. 1 and 2), the control valve 55C is operated and pilot pressure is output from the control valve 55C. This pilot pressure is applied to the pressure-receiving portion 53a of the left traveling pump 53L via the first traveling fluid line 45a, and to the pressure-receiving portion 53b of the right traveling pump 53R via the fourth traveling fluid line 45d. In this manner, the swash plate angles of the left traveling pump 53L and the right traveling pump 53R are changed, and the left traveling motor 36L rotates forwardly and the right traveling motor 36R rotates reversely, and the working machine 1 spins to turn rightward (that is, spin turn).

When the traveling control member 59 is swung to the left (in a direction indicated by an arrowed line A3 in FIGS. 1 and 2), the control valve 55D is operated and pilot pressure is output from the control valve 55D. This pilot pressure is applied to the pressure-receiving portion 53a of the right traveling pump 53R via the third traveling fluid line 45c, and to the pressure-receiving portion 53b of the left traveling pump 53L via the second traveling fluid line 45b. In this manner, the swash plate angles of the left traveling pump 53L and the right traveling pump 53R are changed, and the left traveling motor 36L rotates reversely and the right traveling motor 36R rotates forwardly, and the working machine 1 spins to turn leftward (that is, spin turn).

When the traveling operation member 59 is swung in an oblique direction (in a direction indicated by an arrowed line A5 in FIG. 2), rotation directions and rotation speeds of the left traveling motor 36L and the right traveling motor 36R are determined by a differential pressure between the pilot pressures applied to the pressure receiving portion 53a and the pressure receiving portion 53b, and the working machine 1 pivots to turn rightward or leftward while traveling forward or backward.

That is, when the traveling operation member 59 is swung obliquely forward to the left, the working machine 1 turns to the left while traveling forward at a speed corresponding to the swing angle of the traveling operation member 59. When the traveling operation member 59 is swung obliquely forward to the right, the working machine 1 turns to the right while traveling forward at a speed corresponding to the swing angle of the traveling operation member 59. When the traveling operation member 59 is swung obliquely backward to the left, the working machine 1 turns to the left while traveling backward at a speed corresponding to the swing angle of the traveling operation member 59. In addition, when the traveling operation member 59 is swung obliquely backward to the right, the working machine 1 turns to the right while traveling backward at a speed corresponding to the swing angle of the traveling operation member 59.

As shown in FIG. 1, the working machine 1 has a controller 60. The controller 60 performs various controls of the working machine 1 and is constituted of semiconductors such as a CPU, an MPU, electrical and electronic circuits, or the like. A mode switch 66, a speed changer switch 67, and a plurality of rotation detectors 68 are connected to the controller 60.

The mode switch 66 is a switch configured to enable or disable automatic deceleration. For example, the mode switch 66 is a switch capable of being switched between on and off, and when being on, the mode switch 66 switches the automatic deceleration to be enabled, and when being off, the mode switch 66 switches the automatic deceleration to be disabled.

The speed changer switch 67 is provided in the vicinity of the driver seat 8 and can be operated by a driver (an operator). The speed changer switch 67 is capable of manually switching the speed stage of rotation speed of each of the traveling motors 36L and 36R (that is, the left traveling motor 36L and right traveling motor 36R) to either the first speed stage or the second speed stage. For example, the speed changer switch 67 is a seesaw switch capable of ordering an accelerating operation for switching rotation speeds of the traveling motors 36L and 36R from the first speed stage to the second speed stage, and a decelerating operation for shifting the speed stage of rotation speed of each of the traveling motors 36L and 36R from the second speed stage to the first speed stage.

The plurality of rotation detectors 68 are constituted of sensors and the like to detect the current rotation speeds (referred to as motor rotation speeds) of the traveling motors 36L and 36R. The rotation detectors 68 include a first rotation detector 68a configured to detect a motor rotation speed of the left traveling motor 36L (referred to as a first rotation speed) and a second rotation detector 68b configured to detect a motor rotation speed of the right traveling motor 36R (referred to as a second rotation speed).

The controller 60 has an automatic decelerator 61. The automatic decelerator 61 is constituted of an electrical and electronic circuit or the like installed in the controller 60, a computer program stored in the controller 60, and the like.

The automatic decelerator 61 executes an automatic deceleration control when automatic deceleration is enabled, and does not execute the automatic deceleration control when the automatic deceleration is disabled.

In the automatic deceleration control, in a state where the traveling motors 36L and 36R are rotated at the second speed stage, the speed stage of rotation speed of each of the traveling motors 36L and 36R is automatically switched from the second speed stage to the first speed stage when a predetermined condition (referred to as an automatic deceleration condition) is satisfied. In the automatic deceleration control, when the automatic deceleration condition is satisfied at least in a state where the traveling motors (that is, the left traveling motor 36L and the right traveling motor 36R) are each at the second speed stage, the controller 60 demagnetizes a solenoid of the second switching valve 72 to switch the second switching valve 72 from the second position 72b to the first position 72a, and the rotation speeds of the traveling motors (that is, the left traveling motor 36L and the right traveling motor 36R) are reduced by shifting the speed stage of rotation speed of each of the traveling motors from the second speed stage to the first speed stage. That is, in the automatic deceleration control, the controller 60 reduces the rotation speeds of both the left traveling motor 36L and the right traveling motor 36R by shifting the speed stage of rotation speed of each of the traveling motors from the second speed stage to the first speed stage.

In a case where the rotation speeds of the traveling motors 36L and 36R set at the respective second speed stages are reduced due to a load or the like in traveling, the automatic decelerator 61 does not perform automatic deceleration as far as the reduced rotation speed of each of the traveling motors 36L and 36R is not less than the maximum rotation speed of each of the traveling motors 36L and 36R at the first speed stage. This prevents the automatic deceleration from being performed, for example, during acceleration of the working machine 1, thereby preventing the acceleration from being interrupted.

When a predetermined return condition is satisfied after the automatic deceleration is performed, the automatic decelerator 61 demagnetizes a solenoid of the second switching valve 72 to switch the second switching valve 72 from the first position 72a to the second position 72b, and increases rotation speeds of the traveling motors 36L and 36R by shifting the speed stage of rotation speed of each of the traveling motors 36L and 36R from the first speed stage to the second speed stage. That is, the speed stage of rotation speed of each of the traveling motors 36L and 36R returns to the second speed stage. In other words, when the speed stage of rotation speed of each of the traveling motors 36L and 36R returns from the first speed stage to the second speed stage, the controller 60 increases the rotation speeds of both the left traveling motor 36L and the right traveling motor 36R by shifting the speed stage of rotation speed of each of the traveling motors 36L and 36R from the first speed stage to the second speed stage.

When the automatic deceleration is disabled, the controller 60 performs a manual switching control to switch the speed stage of rotation speed each of the traveling motors 36L and 36R to either the first speed stage or the second speed stage in response to operation of the speed changer switch 67. In the manual switching control, when the speed changer switch 67 is switched to the first speed position, the solenoid of the second switching valve 72 is demagnetized to set the rotation speed of each of the traveling motors 36L and 36R at the first speed stage. In the manual switching control, when the speed changer switch 67 is switched to the second speed position, the solenoid of the second switching valve 72 is magnetized to set the rotation speed of each of the traveling motors 36L and 36R at the second speed stage. In a state where the automatic deceleration is enabled, the controller 60 may switch the speed stage of rotation speed of each of the traveling motors to any one of the first speed stage and the second speed stage in the manual switching control through operation of the speed changer switch 67.

The controller 60 is connected to an acceleration pedal 65 for determining a target revolving speed of the prime mover 32. The acceleration pedal 65 is provided in the vicinity of the driver seat 8. A handy swingable acceleration lever, a rotatable acceleration volume or a slidable acceleration slider may replace the acceleration pedal 65 is an acceleration lever supported swingably, an acceleration pedal supported swingably, an acceleration volume supported rotatably, an acceleration slider supported slidably, or the like. The acceleration pedal 65 is not limited to the examples described above. In addition, the controller 60 is connected to a third rotation detector 69 configured to detect an actual revolving speed of the prime mover 32. The third rotation detector 69 allows the controller 60 to acquire an actual revolving speed of the prime mover 32. Based on an operation extent of the acceleration pedal 65, the controller 60 determines a target revolving speed of the prime mover 32 and controls the actual revolving speed to reach the determined target revolving speed.

The controller 60 performs automatic deceleration based on pressures in the circulation fluid lines 57h and 57i (a control processing to change rotation speeds of the traveling motors 36L and 36R by shifting the speed stage of rotation speed of each of the traveling motors 36L and 36R from the second speed stage to the first speed stage). A plurality of pressure detectors 80 are connected to the circulation fluid lines 57h and 57i. The plurality of pressure detectors 80 include a first pressure detector 80a, a second pressure detector 80b, a third pressure detector 80c, and a fourth pressure detector 80d. The first circulation fluid line 57h includes a portion extended from one port of the left traveling pump 53L and connected to a first port P11 of the left traveling motor 36L, and includes another portion extended from the other port of the left traveling pump 53L and connected to a second port P12 of the left traveling motor 36L. The first pressure detector 80a is provided on the portion of the first circulation fluid line 57h connected to the first port P11 of the left traveling motor 36L, and detects a first traveling pressure V1 applied to the portion of the first circulation fluid line 57h connected to the first port P11 of the left traveling motor 36L. The second pressure detector 80b is provided on the portion of the first circulation fluid line 57h connected to the second port P12 of the left traveling motor 36L, and detects a second traveling pressure V2 applied to the portion of the first circulation fluid line 57h connected to the second port P12 of the left traveling motor 36L. The second circulation fluid line 57i includes a portion extended from one port of the right traveling pump 53R and connected to a third port P13 of the right traveling motor 36R, and includes another portion extended from the other port of the right traveling pump 53R and connected to a fourth port P14 of the right traveling motor 36R. The third pressure detector 80c is provided on the portion of the second circulation fluid line 57i connected to the third port P13 of the right traveling motor 36R, and detects a third traveling pressure V3 applied to the portion of the second circulation fluid line 57i connected to the third port P13 of the right traveling motor 36R. The fourth pressure detector 80d is provided on the portion of the second circulation fluid line 57i connected to the fourth port P14 of the right traveling motor 36R, and detects a fourth traveling pressure V4 applied to the portion of the second circulation fluid line 57i connected to the fourth port P14 of the right traveling motor 36R. The installation positions of the first pressure detector 80a, the second pressure detector 80b, the third pressure detector 80c, and the fourth pressure detector 80d are not limited and may be installed on a line connected to a port of the left traveling pump 53L or a port of the right traveling pump 53R.

In the controller 60, the automatic decelerator 61 performs an automatic deceleration operation (simply referred to as "automatic deceleration") based on the first traveling pressure V1 detected by the first pressure detector 80a, the second traveling pressure V2 detected by the second pressure detector 80b, the third traveling pressure V3 detected by the third pressure detector 80c, and the fourth traveling pressure V4 detected by the fourth pressure detector 80d.

When the traveling motors 36L and 36R are each rotated at the second speed stage and the machine body 2 (or the left traveling device 5L and the right traveling device 5R) pivotally turns left, the controller 60 refers to the third traveling pressure V3 and the fourth traveling pressure V4 reflecting an actual pressure condition of the right traveling motor 36R, and when the third traveling pressure V3 or the fourth traveling pressure V4 is equal to or higher than a first left-turn threshold $ST1_L$, the controller 60 performs the automatic deceleration. On the other hand, when the traveling motors 36L and 36R are each rotated at the second speed stage and the machine body 2 (or the traveling devices 5L and 5R) pivotally turn right, the controller 60 refers to the first traveling pressure V1 and the second traveling pressure V2 reflecting an actual pressure condition of the left traveling motor 36L, and when the first traveling pressure V1 or the second traveling pressure V2 is equal to or higher than a first right-turn threshold $ST1_R$, the automatic deceleration is performed.

The state of the machine body 2 in pivotal turn means a state where the traveling operation member 59 is operated in the direction for pivotal turn or a state where the machine body 2 shows behavior of the pivotal turn. An operation detector including a sensor or the like detects the operational directions of the traveling operation member 59 shown in FIG. 2. Alternatively, a pressure detector may detect a pilot pressure of the traveling fluid lines 45 (that is, the first traveling fluid line 45a, the second traveling fluid line 45b, the third traveling fluid line 45c, and the fourth traveling fluid line 45d), where pressures of operation fluid (that is, pilot pressures) are changed due to operation of the traveling operation member 59; thus the controller 60 may detect the operational directions of the traveling operation member 59 based on changing in the pilot pressures. The configuration and method to detect the operational directions of the traveling operation member 59 is not limited to the above configuration, and may be performed in other configurations and methods.

The controller 60 judges whether to performs automatic deceleration referring to the traveling pressures V1 to V4 when the machine body 2 traveling forward pivotally turns left, when the machine body 2 pivotally turns right, when the machine body 2 traveling backward pivotally turns left, or when the machine body 2 pivotally turns right.

In the above-described embodiment, during the left pivotal turn of the machine body 2, the controller 60 judges whether to perform the automatic deceleration depending on whether or not the third traveling pressure V3 or the fourth traveling pressure V4 is equal to or higher than the first left-turn threshold $ST1_L$, and during the right pivotal turn of the machine body 2, the controller 60 judges whether to perform the automatic deceleration depending on whether or not the first traveling pressure V1 or the second traveling pressure V2 is equal to or higher than the first right-turn threshold $ST1_R$. Alternatively, the controller 60 may judge whether to perform the automatic deceleration based on effective traveling pressures reflecting the traveling pressures V1 to V4 in the following way.

In detail, in a case where the traveling motors 36L and 36R each has a rotational speed set at the second speed stage and the machine body 2 (or the traveling devices 5L and 5R) pivotally turns left, the controller 60 calculates a third differential pressure $\Delta V3$ by subtracting the fourth traveling pressure V4 from the third traveling pressure V3 so as to obtain the third differential pressure $\Delta V3$ serving as an effective third traveling pressure reflecting the actual pressure condition of the right traveling motor 36R, and calculates a fourth differential pressure $\Delta V4$ by subtracting the third traveling pressure V3 from the fourth traveling pressure V4 so as to obtain the fourth differential pressure $\Delta V4$ serving as an effective fourth traveling pressure reflecting the actual pressure condition of the right traveling motor 36R. When the third differential pressure $\Delta V3$ or the fourth differential pressure $\Delta V4$ is equal to or higher than a second left-turn threshold $ST2_L$, the controller 60 performs the automatic deceleration.

In a case where the traveling motors 36L and 36R each has a rotation speed set at the second speed stage and the machine body 2 pivotally turns right, the controller 60 calculates a first differential pressure $\Delta V1$ by subtracting the second traveling pressure V2 from the first traveling pressure V1 so as to obtain the first differential pressure $\Delta V1$ serving as an effective first traveling pressure reflecting the actual pressure of the left traveling motor 36L. In addition, the controller 60 calculates a second differential pressure ΔV2 by subtracting the first traveling pressure V1 from the second traveling pressure V2 so as to obtain the second differential pressure ΔV2 serving as an effective second traveling pressure reflecting the actual pressure condition of the left traveling motor 36L. When the first differential pressure ΔV1 or the second differential pressure ΔV2 is equal to or higher than a second right-turn threshold $ST2_R$, the controller 60 performs automatic deceleration.

The controller 60 determines the left-turn thresholds (that is, the first left-turn threshold $ST1_L$ and the second left-turn threshold $ST2_L$) to be used in the left pivotal turn and the right-turn thresholds (that is, the first right-turn thresholds $ST1_R$ and the second right-turn thresholds $ST2_R$) to be used in the right pivotal turn, based on rotation speeds of the traveling motors 36L and 36R. That is, the controller 60 determines the left-turn threshold and the right-turn threshold as deceleration thresholds for judging suitability of execution of the automatic deceleration based on rotation speeds of the traveling motors 36L and 36R.

For convenience of explanation, the rotation speed of the left traveling motor 36L is hereinafter referred to as a "first rotation speed $LM_{RPM}$", and the rotation speed of the right traveling motor 36R as a "second rotation speed $RM_{RPM}$."

FIG. 3 shows the relationship between the left-turn thresholds (that is, the first left-turn threshold $ST1_L$ and the second left-turn threshold $ST2_L$) and the second rotation speed $RM_{RPM}$. For convenience of explanation, FIG. 3 shows two left-turn thresholds, i.e., the first left-turn threshold $ST1_L$ and the second left-turn threshold $ST2_L$ prepared for the second rotation speed $RM_{RPM}$; however, the controller 60 needs determine either one of the first left-turn threshold $ST1_L$ and the second left-turn threshold $ST2_L$.

As shown in FIG. 3, the controller 60 determines the left-turn thresholds (that is, the first left-turn threshold $ST1_L$ and the second left-turn threshold $ST2_L$) each of which becomes lower as the second rotation speed $RM_{RPM}$ decreases, and each of which becomes higher as the second rotation speed $RM_{RPM}$ increases. As shown in FIG. 3, the controller 60 may determine the left-turn threshold (that is, the first left-turn threshold $ST1_L$ or the second left-turn threshold $ST2_L$) by applying the second rotation speed $RM_{RPM}$ detected by the second rotation detector 68b to lines L1 and L2 representing relationships between the second rotation speed $RM_{RPM}$ and the left-turn thresholds (that is, the first left-turn threshold $ST1_L$ and the second left-turn threshold $ST2_L$).

Alternatively, control data such as equations (that is, linear function equations representing the lines L1 and L2 in FIG. 3) or a table, which show the relationships between the second rotation speed $RM_{RPM}$ and the left-turn thresholds $ST1_L$ and $ST2_L$, may be stored in the storage 63 in advance, and the controller 60 may determine the left-turn thresholds (that is, the first left-turn threshold $ST1_L$ and the second left-turn threshold $ST2_L$) by extracting the first left-turn threshold $ST1_L$ and second left-turn threshold $ST2_L$ corresponding to the second rotation speed $RM_{RPM}$ detected by the second rotation detector 68b from the control data.

FIG. 4 shows relationships between the right-turn thresholds (that is, the first right-turn threshold $ST1_R$ and the second right-turn threshold $ST2_R$) and the first rotation speed $LM_{RPM}$. For convenience of explanation, FIG. 3 shows two right-turn thresholds, i.e., the first right-turn threshold $ST1_R$ and the second right-turn threshold $ST2_R$ prepared for the first rotation speed $LM_{RPM}$; however, the controller 60 needs determine either one of the first right-turn threshold $ST1_R$ and the second right-turn threshold $ST2_R$.

As shown in FIG. 4, the controller 60 determines the right-turn thresholds (that is, the first right-turn threshold ST1R and the second right-turn threshold $ST2_R$) each of which becomes lower as the first rotation speed $LM_{RPM}$ decreases, and each of which becomes higher as the first rotation speed $LM_{RPM}$ increases. As shown in FIG. 4, the controller 60 may determine the right-turn thresholds (that is, the first right-turn threshold $ST1_R$ and the second right-turn threshold $ST2_R$) by applying the first rotation speed $LM_{RPM}$ detected by the first rotation detector 68a to lines L3 and L4 showing the relationships between the first rotation speed $LM_{RPM}$ and the right-turn thresholds (that is, the first right-turn threshold $ST1_R$ and the second right-turn threshold $ST2_R$).

Alternatively, control data such as an equations (that is, linear function equations representing the lines L3 and L4 in FIG. 4) or a table showing the relationships between the first rotation speed $LM_{RPM}$ and the first right-turn threshold $ST1_R$ and the second right-turn threshold $ST2_R$ may be stored in the storage 63 in advance, and the controller 60 may determine the right-turn thresholds (that is, the first right-turn threshold $ST1_R$ and the second right-turn threshold $ST2_R$) by extracting the first right-turn threshold $ST1_R$ and the second right-turn threshold $ST2_R$ corresponding to the first rotation speed $LM_{RPM}$ detected by the first rotation detector 68a from the control data.

That is, the controller 60 performs the automatic deceleration in the left pivotal turn of the machine body 2 based on the left-turn thresholds (that is, the first left-turn threshold $ST1_L$ and the second left-turn threshold $ST2_L$) determined according to the second rotation speed $RM_{RPM}$ of the right traveling motor 36R opposite to the left traveling motor 36L. In addition, the controller 60 performs the automatic deceleration in the right pivotal turn of the machine body 2 based on the right-turn thresholds (that is, the first right-turn threshold $ST1_R$ and the second left-turn threshold $ST2_L$) determined according to the first rotation speed $LM_{RPM}$ of the left traveling motor 36L opposite to the right traveling motor 36R.

In detail, the controller 60 refers to the second rotation speed $RM_{RPM}$ to determine the first left-turn threshold $ST1_L$ in left pivotal turn. After determination of the first left-turn threshold $ST1_L$, the controller 60 the performs automatic deceleration when the third traveling pressure V3 or the fourth traveling pressure V4 is equal to or higher than the first left-turn threshold $ST1_L$. Alternatively, the controller 60 refers to the second rotation speed $RM_{RPM}$ to determine the second left-turn threshold $ST2_L$ in left pivotal turn. After determination of the second left-turn threshold $ST2_L$, the controller 60 performs the automatic deceleration when the third differential pressure ΔV3 or the fourth differential pressure ΔV4 is equal to or higher than the second left-turn threshold $ST2_L$.

The controller 60 refers to the first rotation speed $LM_{RPM}$ to determine the first right-turn threshold STIR in right pivotal turn. After determination of the first right-turn threshold $ST1_R$, the controller 60 performs the automatic deceleration when the first traveling pressure V1 or the second traveling pressure V2 is equal to or higher than the first right-turn threshold $ST1_R$. Alternatively, the controller 60 refers to the first rotation speed $LM_{RPM}$ to determine the second right-turn threshold $ST2_R$ in right pivotal turn. After determination of the second right-turn threshold $ST2_R$, the controller 60 performs the automatic deceleration when the first differential pressure $\Delta V1$ or the second differential pressure $\Delta V2$ is equal to or higher than the second right-turn threshold $ST2_R$.

The controller 60 may change the left-turn thresholds (that is, the first left-turn threshold $ST1_L$ and the second left-turn threshold $ST2_L$) and the right-turn thresholds (that is, the first right-turn threshold $ST1_R$ and the second right-turn threshold $ST2_R$) according to a revolving speed of the prime mover 32.

In the above-described embodiment, as shown in FIGS. 3 and 4, both the left-turn threshold and the right-turn threshold (that is, the first left-turn threshold $ST1_L$, second left-turn threshold $ST2_L$, first right-turn threshold $ST1_R$, and second right-turn threshold $ST2_R$) are determined based on the rotation speeds $LM_{RPM}$ and $RM_{RPM}$; however, the automatic deceleration does not have to be performed when each of all the rotation speeds $LM_{RPM}$ and $RM_{RPM}$ is a predetermined threshold M30 or above, that is, when each of rotation speeds of all the traveling motors 36L and 36R is in a speed range from the threshold M30 to the maximum speed. For convenience of explanation, the left-turn thresholds (that is, the first left-turn threshold $ST1_L$ and second left-turn threshold $ST2_L$) and right-turn thresholds (that is, the first right-turn threshold $ST1_R$ and second right-turn threshold $ST2_R$) for each of the first rotation speed $LM_{RPM}$ and second rotation speed $RM_{RPM}$ are determined as being the threshold M30 or below (that is, the lines L1 and L2 end at the threshold M30); however, there is no problem if the calculation of the left and right-turn thresholds is performed above the threshold M30.

Now, in a case where the rotation speeds of the traveling motors 36L and 36R are each set at the second speed stage and the machine body 2 (or the traveling devices 5L and 5R) spin-turns left or right, the controller 60 performs the automatic deceleration when any one of the first traveling pressure V1, second traveling pressure V2, third traveling pressure V3, and fourth traveling pressure V4 is equal to or higher than the first spin-turn threshold $ST1_P$.

Alternatively, in a case where the rotation speeds of the traveling motors 36L and 36R are each set at the second speed stage and the machine body 2 spin-turns left or right, the controller 60 performs the automatic deceleration when any one of the first differential pressure $\Delta V1$, second differential pressure $\Delta V2$, third differential pressure $\Delta V3$, and fourth differential pressure $\Delta V4$ is equal to or higher than the second spin-turn threshold $ST2_P$. The state of the machine body 2 in spin-turn means a state where the traveling operation member 59 is operated in the direction for spin-turn or a state where the machine body 2 shows behavior of the spin-turn.

When the machine body 2 spin-turns, the controller 60 determines a spin-turn threshold (that is, a first spin-turn threshold $ST1_P$ or a second spin-turn threshold $ST2_P$) as the deceleration threshold for spin-turn, which is lower than the left-turn threshold $ST1_L$ or $ST2_L$ and the right-turn threshold $ST1_R$ or $ST2_R$ for the pivotal turn. In addition, the controller 60 determines the spin-turn threshold which varies according to either one of the first rotation speed $LM_{RPM}$ of the left traveling motor 36L and the second rotation speed $RM_{RPM}$ of the right traveling motor 36R higher (or faster) than the other.

Then, in a case where rotation speeds of the traveling motors 36L and 36R are each determined at the second speed stage and the machine body 2 travels straight forward, the controller 60 performs the automatic deceleration when the first traveling pressure V1 or the third traveling pressure V3 is equal to or higher than a first straight-traveling threshold $SF1_S$.

Alternatively, in a case where rotation speeds of the traveling motors 36L and 36R are each determined at the second speed stage and the machine body 2 travels straight forward, the controller 60 performs the automatic deceleration when the first differential pressure $\Delta V1$ or the third differential pressure $\Delta V3$ is equal to or higher than a second straight-traveling threshold $SF2_S$.

The state of the machine body 2 traveling straight means a state where the traveling operation member 59 is operated in the direction for straight traveling or when the machine body 2 shows behavior of the straight traveling. An operation of straight traveling by the traveling operation member 59 can be detected by the operation detector including a sensor or the like or detected by a pressure detector or the like, in the same manner as the above-described pivotal turn.

Figure 2:
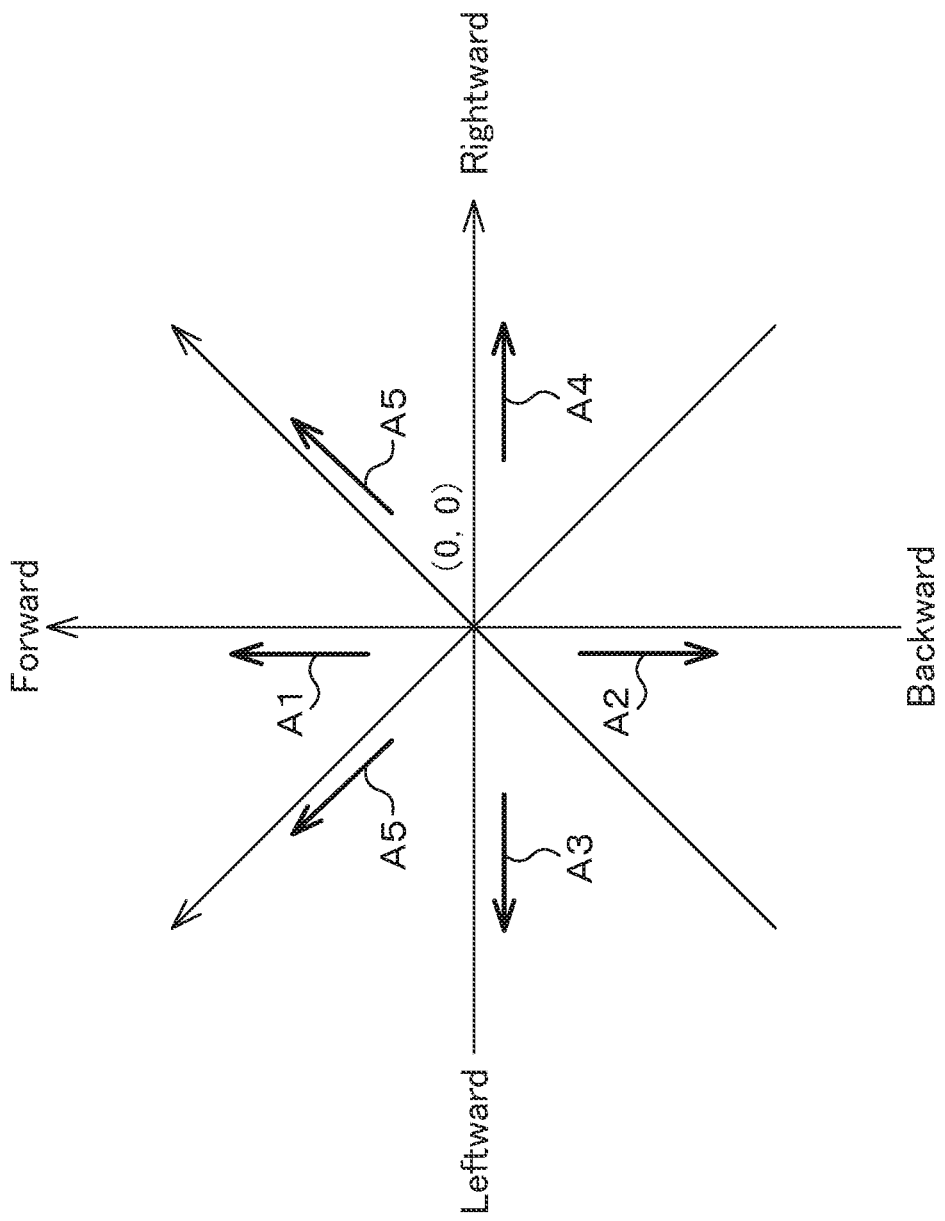
FIG. 2 is a view showing an operational direction of a traveling operation member.

In addition, when an operational direction of the traveling operation member 59 changes from the pivotal turn direction to the straight-traveling direction, the controller 60 judges whether to perform the automatic deceleration based on the straight-traveling thresholds $SF1_S$ and $SF2_S$. The operation of the traveling operation member 59 for straight traveling is to tilt the traveling operation member 59 forward or backward, as shown in FIG. 2. Even when the operational direction of the traveling operation member 59 is oblique, the oblique operation direction is included in the operation direction for straight traveling as far as it is included in a predetermined range allowable for the operation for straight traveling.

Specifically, the controller 60 determines the straight-traveling threshold (that is, the first straight-traveling threshold $SF1_S$ or the second straight-traveling threshold $SF2_S$) based on a rotation difference $\Delta MP$ between the first rotation speed $LM_{RPM}$ detected by the first rotation detector 68a and the second rotation speed $RM_{RPM}$ detected by the second rotation detector. The rotation difference $\Delta MP$ may be a value obtained by subtracting the second rotation speed $RM_{RPM}$ from the first rotation speed $LM_{RPM}$, or a value obtained by subtracting the first rotation speed $LM_{RPM}$ from the second rotation speed $RM_{RPM}$. If the rotation difference $\Delta MP$ is a negative value, the rotation difference $\Delta MP$ shall be an absolute value.

FIG. 5 shows a relationship between the straight-traveling thresholds (that is, the first straight-traveling threshold $SF1_S$ and the second straight-traveling threshold $SF2_S$) and the rotation difference $\Delta MP$. For convenience of explanation, FIG. 5 shows two straight-traveling thresholds, the first straight-traveling threshold $SF1_S$ and the second straight-traveling threshold $SF2_S$, for the rotation difference $\Delta MP$; however, the controller 60 only needs to determine either the first straight-traveling threshold $SF1_S$ or the second straight-traveling threshold $SF2_S$.

As shown in FIG. 5, the controller 60 determines the straight-traveling threshold (that is, the first straight-traveling threshold $SF1_S$ or the second straight-traveling threshold $SF2_S$) which becomes higher as the rotation difference $\Delta MP$ increases, and which becomes lower as the rotation difference $\Delta MP$ decreases. As shown in FIG. 5, the controller 60 may determine the first straight-traveling threshold $SF1_S$ or the second straight-traveling threshold $SF2_S$ by applying the calculated rotation difference $\Delta MP$ to a line L5 or L6 that show the relationship between the straight-traveling threshold $SF1_S$ or $SF2_S$ and the rotation difference $\Delta MP$.

Alternatively, control data such as an equation (that is, a linear function equation representing the line L5 or L6 in FIG. 5) or a table showing the relationship between the rotation difference ΔMP and the straight-traveling threshold $SF1_S$ or $SF2_S$ may be stored in the storage 63 in advance, and the controller 60 may extract the first straight-traveling threshold $SF1_S$ or the second straight-traveling threshold $SF2_S$ corresponding to the calculated rotation difference ΔMP from the control data.

That is, when the working vehicle 1 travels straight forward, i.e., during straight forward traveling of the machine body 2, the controller 60 performs the automatic deceleration based on the straight-traveling threshold (that is, the first straight-traveling threshold $SF1_S$ or the second straight-traveling threshold $SF2_S$) determined according to the rotation difference ΔMP between the first rotation speed $LM_{RPM}$ and the second rotation speed $RM_{RPM}$.

In detail, the controller 60 refers to the first rotation speed $LM_{RPM}$ and the second rotation speed $RM_{RPM}$ in forward traveling to calculate the rotation difference ΔMP, and determines the first straight-traveling threshold $SF1_S$ based on the calculated rotation difference ΔMP. After determination of the first straight traveling threshold $SF1_S$, the controller 60 performs the automatic deceleration when the first traveling pressure V1 or the third traveling pressure V3 is equal to or higher than the first straight traveling threshold $SF1_S$. Alternatively, the controller 60 calculates the rotation difference ΔMP in forward traveling, and determines the second straight traveling threshold $SF2_S$ based on the calculated rotation difference ΔMP. After determination of the second straight traveling threshold $SF2_S$, the controller 60 performs the automatic deceleration when the first differential pressure ΔV1 or the third differential pressure ΔV3 is equal to or higher than the second straight traveling threshold $SF2_S$.

In the embodiment described above, each of the first straight-traveling threshold $SF1_S$ and the second straight-traveling threshold $SF2_S$ is acquired based on the rotation difference ΔMP; alternatively, the first straight-traveling threshold $SF1_S$ or the second straight-traveling threshold $SF2_S$ may be acquired based on a rotation-ratio difference ΔDP. The rotation-ratio difference ΔDP is a difference between a first ratio acquired by dividing the second rotation speed $RM_{RPM}$ by the first rotation speed $LM_{RPM}$ and a second ratio acquired by dividing the first rotation speed $LM_{RPM}$ by the second rotation speed $RM_{RPM}$. If the rotation-ratio difference ΔDP is a negative value, the absolute value shall be applied.

The controller 60 acquires the rotation-ratio difference ΔDP using the first rotation speed $LM_{RPM}$ and the second rotation speed $RM_{RPM}$, and determines the straight-traveling threshold (that is, the first straight-traveling threshold $SF1_S$ or the second straight-traveling threshold $SF2_S$) based on the rotation-ratio difference ΔDP.

FIG. 6A shows relationships between the straight-traveling thresholds (that is, the first straight-traveling threshold $SF1_S$ and the second straight-traveling threshold $SF2_S$) and the rotation-ratio difference ΔDP. For convenience of explanation, FIG. 6 shows that two straight-traveling thresholds, i.e., the first straight-traveling threshold $SF1_S$ and the second straight-traveling threshold $SF2_S$ prepared for the rotation-ratio difference ΔDP, but the controller 60 only needs to determine either one of the first straight-traveling threshold $SF1_S$ and the second straight-traveling threshold $SF2_S$.

As shown in FIG. 6A, the controller 60 determines the straight-traveling thresholds (that is, the first straight-traveling threshold $SF1_S$ and the second straight-traveling threshold $SF2_S$) each of which becomes higher as the corresponding rotation-ratio difference ΔDP increases, and each of which becomes lower as the corresponding rotation-ratio difference ΔDP decreases. As shown in FIG. 6A, the controller 60 may determine the first straight-traveling threshold $SF1_S$ and the second straight-traveling threshold $SF2_S$ by applying the calculated rotation-ratio difference ΔDP to lines L7 and L8 that show the relationships between the straight-traveling thresholds $SF1_S$ and $SF2_S$ and the rotation-ratio difference ΔDP.

Alternatively, control data such as equations (that is, linear function equations representing the lines L7 and L8 in FIG. 6A) or a table showing the relationships between the rotation-ratio difference ΔDP and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the calculated rotation-ratio difference ΔDP from the control data.

That is, in forward traveling, the controller 60 performs the automatic deceleration based on the straight-traveling thresholds (that is, the first straight-traveling threshold $SF1_S$ and the second straight-traveling threshold $SF2_S$) determined based on the rotation-ratio difference ΔDP between the first rotation speed $LM_{RPM}$ and the second rotation speed $RM_{RPM}$.

In detail, the controller 60 refers to the first rotation speed $LM_{RPM}$ and the second rotation speed $RM_{RPM}$ in forward traveling to calculate the rotation-ratio difference ΔDP, and determines the first straight-traveling threshold $SF1_S$ based on the calculated rotation-ratio difference ΔDP. After determination of the first straight traveling threshold $SF1_S$, the controller 60 performs the automatic deceleration when the first traveling pressure V1 or the third traveling pressure V3 is equal to or higher than the first straight traveling threshold $SF1_S$. Alternatively, the controller 60 calculates the rotation-ratio difference ΔDP in forward traveling, and determines the second straight traveling threshold $SF2_S$ based on the calculated rotation-ratio difference ΔDP. After determination of the second straight-traveling threshold $SF2_S$, the controller 60 performs the automatic deceleration when the first differential pressure ΔV1 or the third differential pressure ΔV3 is equal to or higher than the second straight-traveling threshold $SF2_S$.

In the above-described embodiment, the straight-traveling thresholds (that is, the first straight-traveling threshold $SF1_S$ and the second straight-traveling threshold $SF2_S$) are determined based on the rotation-ratio difference ΔDP, but the straight-traveling thresholds (that is, the first straight-traveling threshold $SF1_S$ and the second straight-traveling threshold $SF2_S$) may be determined based on a ratio (that is, a rotation ratio) ΔDQ between the first rotation speed $LM_{RPM}$ and the second rotation speed $RM_{RPM}$.

As shown in FIG. 6B, the controller 60 determines the straight-traveling thresholds (that is, the first straight-traveling threshold $SF1_S$ and the second straight-traveling threshold $SF2_S$) each of which becomes higher as the rotation ratio ΔDQ decreases, and which becomes lower as the rotation ratio ΔDQ increases. As shown in FIG. 6B, the controller 60 may determine the straight-traveling thresholds (that is, the first straight-traveling threshold $SF1_S$ and the second straight-traveling threshold $SF2_S$) by applying the calculated rotation ratio ΔDQ to lines L9 and L10 that show the relationships between the straight-traveling thresholds $SF1_S$ and $SF2_S$ and the rotation ratio ΔDQ.

Alternatively, control data such as equations (that is, linear function equations representing the lines L9 and L10 in FIG. 6B) or a table showing the relationships between the rotation ratio ΔDQ and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the calculated rotation ratio ΔDQ from the control data.

That is, the controller 60 performs the automatic deceleration in forward traveling based on the straight-traveling thresholds (that is, the first straight-traveling threshold $SF1_S$ the second straight-traveling threshold $SF2_S$) determined by the rotation ratio ΔDQ between the first rotation speed $LM_{RP}M$ and the second rotation speed $RM_{RPM}$.

In detail, the controller 60 refers to the first rotation speed $LM_{RPM}$ and the second rotation speed $RM_{RPM}$ in forward traveling to calculate the rotation ratio ΔDQ, and determines the first straight-traveling threshold $SF1_S$ based on the calculated rotation ratio ΔDQ. After determination of the first straight traveling threshold $SF1_S$, the controller 60 performs the automatic deceleration when the first traveling pressure V1 or the third traveling pressure V3 is equal to or higher than the first straight traveling threshold $SF1_S$.

Alternatively, the controller 60 calculates the rotation ratio ΔDQ in forward traveling, and determines the second straight traveling threshold $SF2_S$ based on the calculated rotation ratio ΔDQ. After determination of the second straight-traveling threshold $SF2_S$, the controller 60 performs the automatic deceleration when the first differential pressure ΔV1 or the third differential pressure ΔV3 is equal to or higher than the second straight-traveling threshold $SF2_S$.

In the above-described embodiment, the first straight-traveling threshold $SF1_S$ and the second straight-traveling threshold $SF2_S$ are determined based on the rotation difference ΔMP or the rotation-ratio difference ΔDP, but alternatively, the first straight-traveling threshold $SF1_S$ and the second straight-traveling threshold $SF2_S$ may be determined based on the first rotation speed $LM_{RPM}$ and the second rotation speed $RM_{RPM}$.

Figure 7:
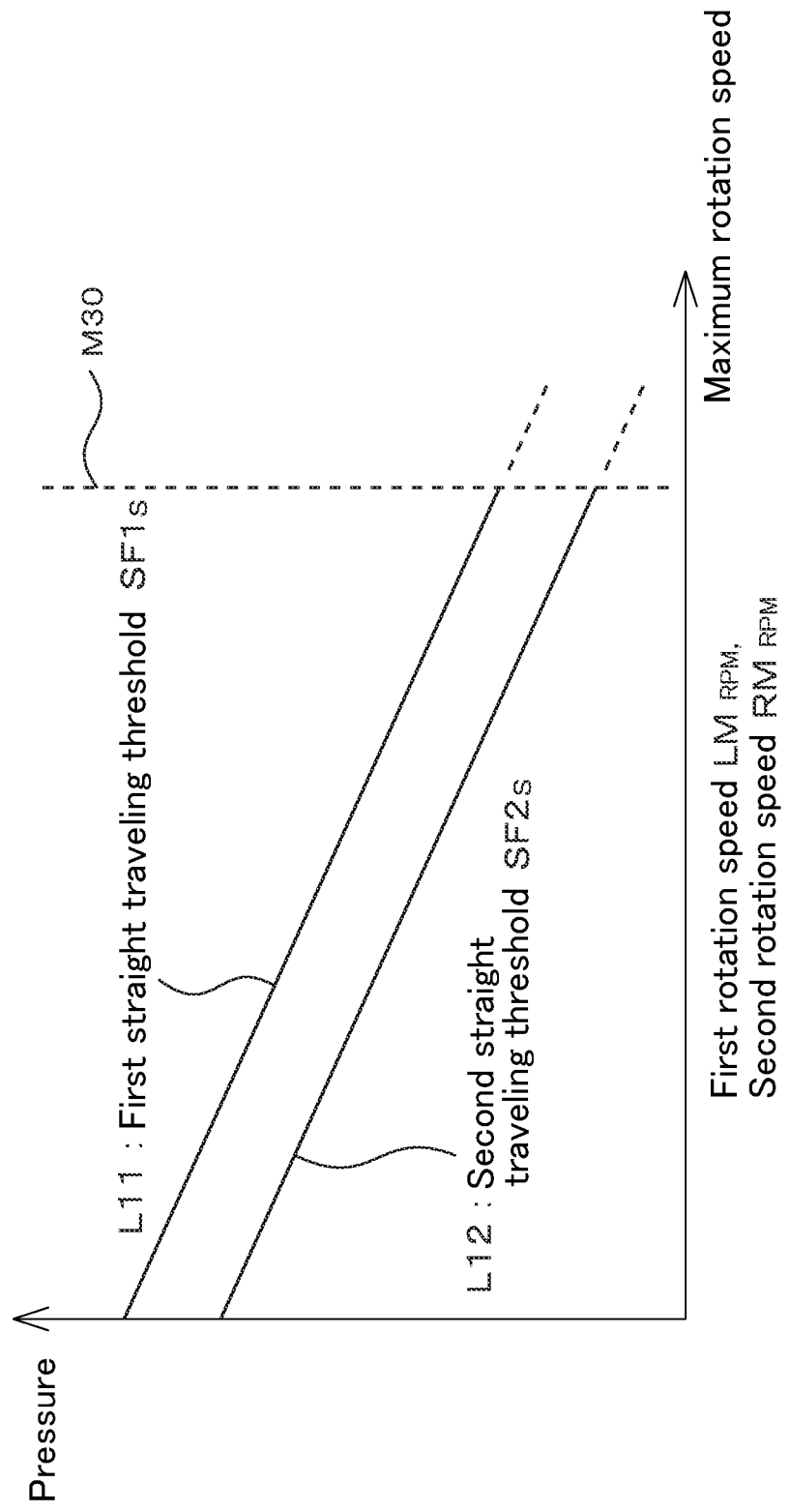
FIG. 7 is a view showing a relationship between the first rotation speed $LM_{RPM}$, a second rotation speed $RM_{RPM}$, the first straight threshold $SF1_S$, the second straight threshold $SF2_S$.

As shown in FIG. 7, the controller 60 determines the straight-traveling thresholds (that is, the first straight-traveling threshold $SF1_S$ and the second straight-traveling threshold $SF2_S$) which become lower as the first rotation speed $LM_{RPM}$ and the second rotation speed $RM_{RPM}$ decrease, and which become higher as the first rotation speed $LM_{RPM}$ and the second rotation speed $RM_{RPM}$ increase. As shown in FIG. 7, the controller 60 may determine first straight-traveling threshold $SF1_S$ and the second straight-traveling threshold $SF2_S$ by applying the first rotation speed $LM_{RPM}$ detected by the first rotation detector 68a and the second rotation speed $RM_{RPM}$ detected by the second rotation detector 68b to lines L11 and L12 showing the relationships between the straight-traveling thresholds $SF1_S$ and $SF2_S$ and the rotation speeds $LM_{RPM}$ and $RM_{RPM}$.

Alternatively, control data such as equations (that is, linear function equations representing the lines L11 and L12 in FIG. 7) or a table showing the relationships between the rotation speeds $LM_{RPM}$ and $RM_{RPM}$ and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the first rotation speed $LM_{RPM}$ and the second rotation speed $RM_{RPM}$ from the control data.

That is, the controller 60 judges whether to perform automatic deceleration with use of the straight-traveling thresholds (that is, the first straight-traveling threshold $SF1_S$ and the second straight-traveling threshold $SF2_S$) determined based on the first rotation speed $LM_{RPM}$ and the second rotation speed $RM_{RPM}$ in forward traveling.

The controller 60 determines the first straight-traveling threshold $SF1_S$ based on the first rotation speed $LM_{RPM}$ and the second rotation speed $RM_{RPM}$. For example, the controller 60 determines the first straight-traveling threshold $SF1_S$ based on a lower one of the first rotation speed $LM_{RPM}$ and the second rotation speed $RM_{RPM}$ or an average of the first rotation speed $LM_{RPM}$ and the second rotation speed $RM_{RPM}$.

After determination of the first straight traveling threshold $SF1_S$, the controller 60 performs automatic deceleration when both the first traveling pressure V1 and the third traveling pressure V3 are continuously equal to or higher than the first straight traveling threshold $SF1_S$. In detail, when a length of time (that is, elapsed time) during which both the first traveling pressure V1 and the third traveling pressure V3 are equal to or higher than the first straight traveling threshold $SF1_S$ is equal to or longer than a first judgment time, the controller 60 performs automatic deceleration. The controller 60 determines the first judgment time which becomes shorter as the first rotation speed $LM_{RPM}$ or the second rotation speed $RM_{RPM}$ increase, and which becomes longer as the first rotation speed $LM_{RPM}$ or the second rotation speed $RM_{RPM}$ decrease.

Alternatively, in forward traveling, the controller 60 determines the second straight-traveling thresholds $SF2_S$ based on the first rotation speed $LM_{RPM}$ and the second rotation speed $RM_{RPM}$. For example, the controller 60 determines the second straight-traveling thresholds $SF2_S$ based on a lower one of the first rotation speed $LM_{RPM}$ and the second rotation speed $RM_{RPM}$ or an average of the first rotation speed $LM_{RPM}$ and the second rotation speed $RM_{RPM}$.

After determination of the second straight-traveling threshold $SF2_S$, the controller 60 performs automatic deceleration when both the first differential pressure ΔV1 and the third differential pressure ΔV3 are continuously equal to or higher than the second straight-traveling thresholds $SF2_S$. In detail, when a length of time (that is, elapsed time) during which both the first differential pressure ΔV1 and the third differential pressure ΔV3 are equal to or higher than the second straight-traveling thresholds $SF2_S$ is equal to or longer than a second judgment time, the controller 60 performs automatic deceleration. The controller 60 determines the second judgment time which becomes shorter as the first rotation speed $LM_{RPM}$ or the second rotation speed $RM_{RPM}$ increase, and which becomes longer as the first rotation speed $LM_{RPM}$ or the second rotation speed $RM_{RPM}$ decrease.

In the above-described embodiment, the controller 60 does not perform automatic deceleration when the traveling operation member 59 is operated in a direction for forward traveling of the machine body 2 and the left traveling motor 36L and the right traveling motor 36R are rotating in a direction corresponding to backward traveling of the machine body 2 backward (that is, in reversely rotating).

In addition, the controller 60 does not perform the automatic deceleration when the first rotation speed $LM_{RPM}$ of the left traveling motor 36L is equal to or higher than a predetermined rotation speed, or when the second rotation speed $RM_{RPM}$ of the right traveling motor 36R is equal to or higher than a predetermined rotation speed. For example, the controller 60 does not perform the automatic deceleration when the first rotation speed $LM_{RPM}$ of the left traveling motor 36L is equal to or higher than the maximum rotation speed (referred to as a first maximum rotation speed) of the left traveling motor 36L at the first speed stage. The controller 60 does not perform the automatic deceleration when the second rotation speed $RM_{RPM}$ of the right traveling motor 36R is equal to or higher than the maximum rotation speed (referred to as a second maximum rotation speed) of the right traveling motor 36R at the first speed stage. According to this configuration, when the first rotation speed $LM_{RPM}$ and the second rotation speed $RM_{RPM}$ are each in the high speed range defined by the second speed stage, the automatic deceleration is prevented, thereby improving workability.

Figure 8:
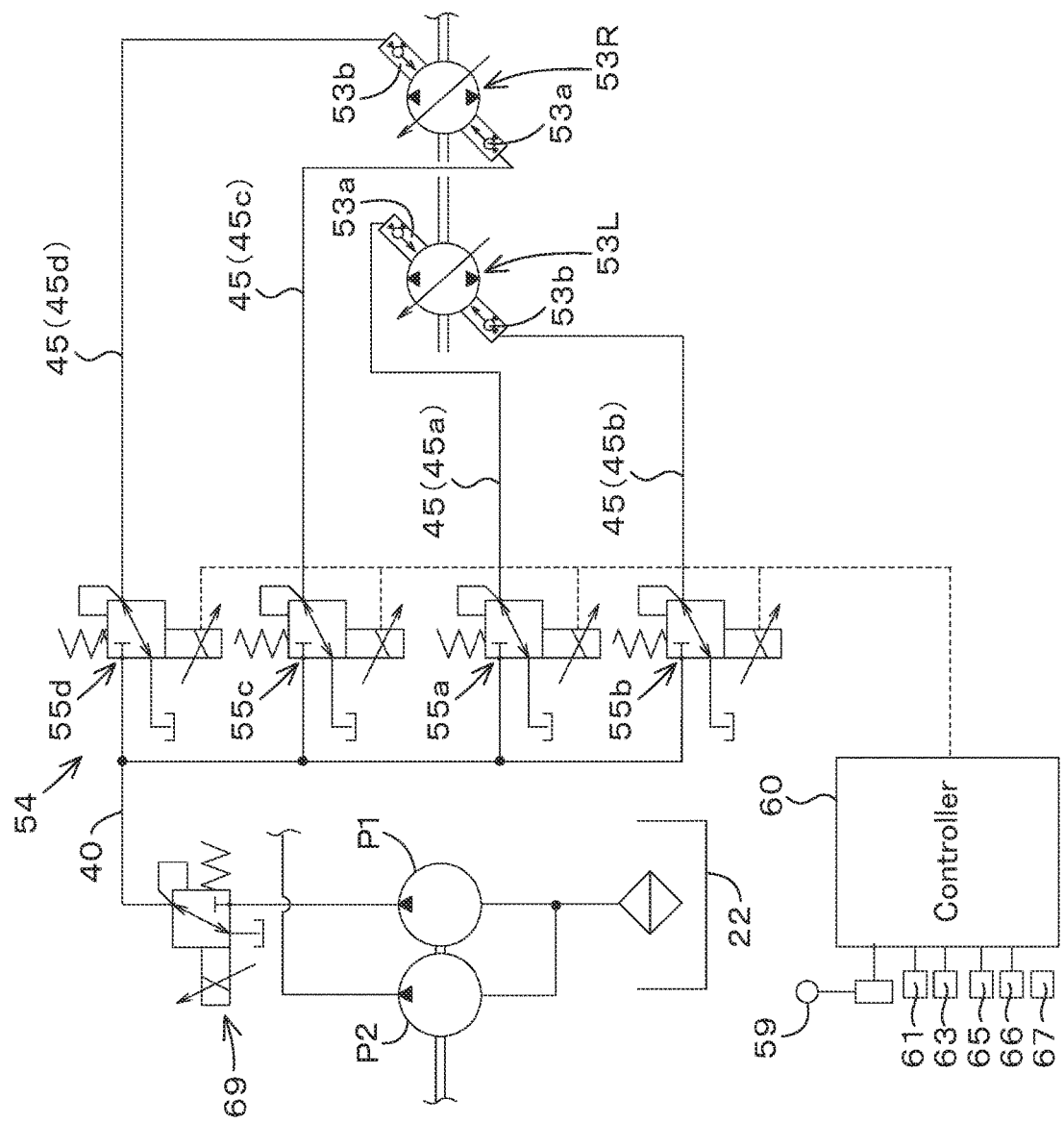
FIG. 8 is a view showing a modified example which an operation device is changed to an electrically-operable operation device such as a joystick.

In the above-described embodiment, the hydraulic traveling operation device 54 configured to change a pilot pressure for operating each of the traveling pumps 53L and 53R using the operation valves 55, but alternatively, an electrically-operated traveling operation device 54 may be used as shown in FIG. 8.

In the example shown in FIG. 8, the traveling operation device 54 has the operation valves 55a, 55b, 55c, and 55d, which are constituted by solenoid proportional valves. The controller 60 is connected to an operation detection sensor 161 to detect an operation extent and operational directions of the operation member 59 that is swung in the lateral direction (that is, the machine width direction) or the fore-and-aft direction. The controller 60 controls the operation valves 55a, 55b, 55c, and 55d based on the operation extent and operational directions of the operation member 59 detected by the operation detection sensor 161.

When the operating member 59 is operated forward (in a direction A1 in FIG. 2), the controller 60 outputs control signals to the operation valves 55a and 55c to tilt the swash plate of each of the first and second traveling pumps 53L and 53R in a direction to deliver operating fluid from each of the first and second traveling pumps 53L and 53R in a normal flow direction, thereby rotating the first and second traveling motors 36L and 36R in respective normal directions. Therefore, the working vehicle 1 travels forward.

When the operating member 59 is operated backward (in a direction A2 in FIG. 2), the controller 60 outputs control signals to the operation valves 55b and 55d to tilt the swash plates of each of the first and second traveling pumps 53L and 53R in a direction to deliver operating fluid from each of the first and second traveling pumps 53L and 53R in a reverse flow direction, thereby rotating the first and second traveling motors 36L and 36R in respective reverse directions. Therefore, the working vehicle 1 travels backward.

When the operating member 59 is operated rightward (in a direction A4 in FIG. 2), the controller 60 outputs the control signal to the operation valve 55a to tilt the swash plate of the first traveling pump 53L in the direction to deliver operation fluid from the first traveling pump 53L in the normal flow direction, and outputs the control signal to the operation valve 55d to turn the swash plate of the second traveling pump 53R in the direction to deliver operation fluid from the second traveling pump 53R in the reverse flow direction, thereby rotating the first traveling motor 36L in the normal direction and rotating the second traveling motor 36R in the reverse direction. Therefore, the working vehicle 1 spin-turns rightward.

Further, when the operating member 59 is operated leftward (in a direction A3 in FIG. 2), the controller 60 outputs the control signal to the operation valve 55b to tilt the swash plate of the first traveling pump 53L in the direction to deliver operation fluid from the first traveling pump 53L in the reverse flow direction, and outputs the control signal to the operation valve 55c to tilt the swash plate of the second traveling pump 53R in the direction to deliver operation fluid from the second traveling pump 53R in the normal flow direction, thereby rotating the first traveling motor 36L in the reverse direction and rotating the second traveling motor 36R in the normal direction. Therefore, the working vehicle 1 spin-turns leftward.

Figure 9:
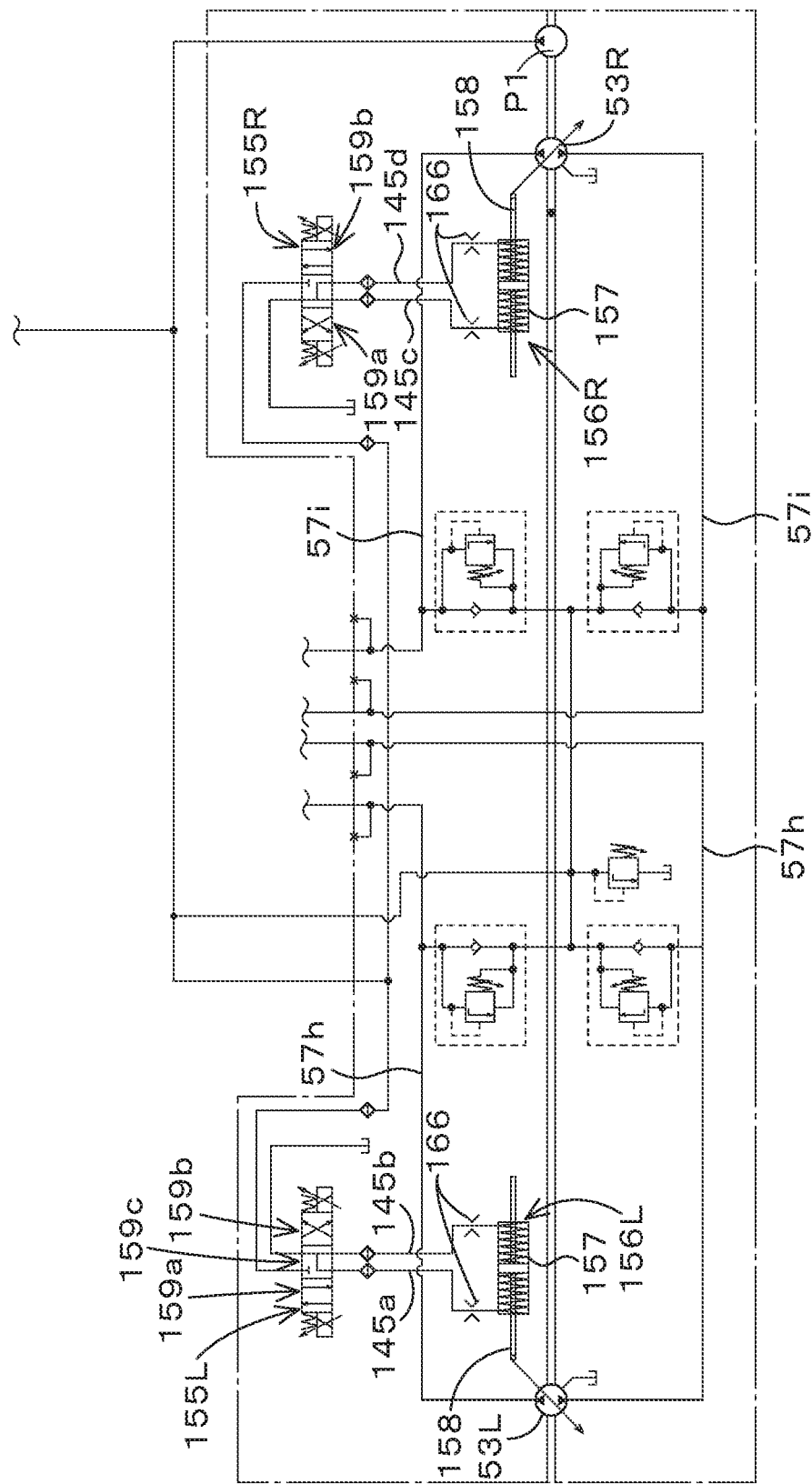
FIG. 9 is a view showing another modified example different from that of FIG. 8.

As shown in FIG. 9, the traveling hydraulic circuit in the hydraulic system of the working machine 1 may be modified. As shown in FIG. 9, the traveling pumps 53L and 53R include hydraulic regulators 156L and 156R, respectively. Each of the hydraulic regulators 156L and 156R has a supply chamber 157 to which operation fluid can be supplied and a piston rod 158 provided in the supply chamber 157. The piston rod 158 of the hydraulic pressure regulator 156L is operably connected to the swash plate of the first traveling pump 53L. The piston rod 158 of the hydraulic pressure regulator 156R is operably connected to the swash plate of the second traveling pump 53R. Angles of the swash plates of traveling pumps 53L and 53R are changed due to the operations (in straight-line movements) of the piston rods 158 of the hydraulic regulators 156L and 156R.

The operation valve 155L is a solenoid proportional valve to operate the hydraulic regulator 156L and is switchable among a first position 159a, a second position 159b, and a neutral position 159c. The operation valve 155L includes a spool movable based on the control signal output from the controller 60 to change a position of the operation valve 155L. A first port of the operation valve 155L is connected to the supply chamber 157 of the hydraulic regulator 156L by the first traveling fluid line 145a. A second port of the operation valve 155L is connected to the supply chamber 157 of the hydraulic regulator 156L by the second traveling fluid line 145b.

The operation valve 155R is a solenoid proportional valve to operate the hydraulic regulator 156R and is switchable among a first position 159a, a second position 159b, and a neutral position 159c. The operation valve 155R includes a spool movable based on the control signal output from the controller 60 to change a position of the operation valve 155R. A first port of the operation valve 155R is connected to the supply chamber 157 of the hydraulic regulator 156R by the third traveling fluid line 145c. A second port of the operation valve 155R is connected to the supply chamber 157 of the hydraulic regulator 156R by the fourth traveling fluid line 145d.

The controller 60 outputs respective control signals to the operation valve 155L and the operation valve 155R to set the operation valves 155L and 155R at the respective first positions 159a. In this manner, the swash plates of the first and second traveling pumps 53L and 53R are each tilted in the direction to deliver operation fluid from each of the first traveling pumps 53L and 53R in the normal flow direction, thereby normally rotating both the first traveling motor 36L and the second traveling motor 36R.

The controller 60 outputs respective control signals to the operation valve 155L and the operation valve 155R to set the operation valves 155L and 155R at the respective second positions 159b. In this manner, the swash plates of the first and second traveling pumps 53L and 53R are each tilted in the direction to deliver operation fluid from each of the first traveling pumps 53L and 53R in the reverse flow direction, thereby reversely rotating both the first traveling motor 36L and the second traveling motor 36R.

In addition, the controller 60 outputs respective control signals to the operation valves 155L and 155R to set the operation valve 155L at the first position 159a and to set the operation valve 155R at the second position 159b. In this manner, the swash plate of the first traveling pump 53L is tilted in the direction to deliver operation fluid from the first traveling pump 53L in the normal flow direction to normally rotate the first traveling motor 36L, and the swash plate of the second operating pump 53R is tilted in the direction to deliver operation fluid from the second traveling pump 53R in the reverse flow direction to reversely rotate the second traveling motor 36R.

Further, the controller 60 outputs respective control signals to the operation valves 155L and 155R to set the operation valve 155L at the second position 159b and to set the operation valve 155R at the first position 159a. In this manner, the swash plate of the first traveling pump 53L is tilted in the direction to deliver operation fluid from the first traveling pump 53L in the reverse flow direction to reversely rotate the first traveling motor 36L, and the swash plate of the second operating pump 53R is tilted in the direction to deliver operation fluid from the second traveling pump 53R to normally rotate the second traveling motor 36R.

Electric actuators such as the solenoid proportional valves 155a to 155d, 155L, and 155R described above may be used to change the angles of the swash plates of the traveling motors 36L and 36R.

In the above-described embodiment, when a predetermined return condition is satisfied, the controller 60 restores (or increases) the rotation speed of each of the traveling motors 36L and 36R by shifting the speed stage from the first speed stage to the second speed stage. In more detail, the controller 60 stores in its internal memory control data such as equations or tables representing lines L1' to L12', which are the same as the lines L1 to L12 shown in FIGS. 3 to 7, for determining the threshold for return (that is, the first left-turn threshold, second left-turn threshold, first right-turn threshold, second right-turn threshold, first straight-traveling threshold, second straight-traveling threshold). Intercepts (that is, intersections with the vertical axis) of the lines L1' to L12' are set to be smaller than intercepts of the corresponding lines L1 to L12.

Thus, the threshold for return, which is obtained based on the control data representing lines L1' to L12', the first rotation speed $LM_{RPM}$, the second rotation speed $RM_{RPM}$, the rotation difference $\Delta MP$, the rotation ratio difference $\Delta DP$, or the rotation ratio $\Delta DQ$, is lower than the deceleration thresholds (that is, the first left-turn threshold $ST1_L$, the second left-turn threshold $ST2_L$, the first right-turn threshold $ST1_R$, the second right-turn threshold $ST2_R$, the first straight-traveling threshold $SF1_S$, the second straight-traveling threshold $SF2_S$) obtained based on the control data representing lines L1 to L12, the first rotation speed $LM_{RPM}$, the second rotation speed $RM_{RPM}$, the rotation difference $\Delta MP$, the rotation ratio difference $\Delta DP$, or the rotation ratio $\Delta DQ$.

In a case where the rotation speeds of the traveling motors 36L and 36R are each set at the second speed stage, the controller 60 returns the speed stage of rotation speed of each of the traveling motors 36L and 36R from the second speed stage to the first speed stage based on the control data representing lines L1' to L12' when any one of the traveling pressure V1 to the fourth traveling pressure V4 becomes equal to or less than the threshold for return.

According to the above embodiment, the working machine 1 has the structures and provides effects as follows.

The working machine 1 incudes the machine body 2, the left traveling device 5L provided on the left portion of the machine body 2, the right traveling device 5R provided on the right portion of the machine body 2, the left traveling motor 36L to output a power to the left traveling device 5L, the right traveling motor 36R to output a power to the right traveling device 5R, the first rotation detector 68a to detect the first rotation speed $LM_{RPM}$ that is the rotation speed of the left traveling motor 36L, the second rotation detector 68b to detect the second rotation speed $RM_{RPM}$ that is the rotation speed of the right traveling motor 36R, the left traveling pump 53L to supply operation fluid to the left traveling motor 36L, the right traveling pump 53R to supply operation fluid to the right traveling motor 36R, the traveling operation device 54 to operate at least one of the left traveling pump 53L and the right traveling pump 53R, and the controller 60 to perform, when the first rotation speed $LM_{RPM}$ and the second rotation speed $RM_{RPM}$ are set at a second speed stage, automatic deceleration to automatically reduce the first rotation speed $LM_{RPM}$ and the second rotation speed $RM_{RPM}$ to the first speed stage lower than the second speed stage. The controller 60 determines, based on the second rotation speed $RM_{RPM}$, the left-turn threshold, i.e., the first left-turn threshold $ST1_L$ or the second left-turn threshold $ST2_L$, as the deceleration threshold for the automatic deceleration to be used when the machine body 2 pivotally turns left. Also, the controller 60 determines, based on the first rotation speed $LM_{RPM}$, the right-turn threshold, i.e., the first right-turn threshold $ST1_R$ or the second right-turn threshold $ST2_R$, as the deceleration threshold for judging whether to perform the automatic deceleration to be used when the machine body 2 pivotally turns right.

According to the above configuration, in a case of left pivotal turn, the second rotation speed $RM_{RPM}$ of the right traveling motor 36R is faster than the first rotation speed $LM_{RPM}$ of the left traveling motor 36L, and in right pivotal turn, the first rotation speed $LM_{RPM}$ of the left traveling motor 36L is faster than the second rotation speed $RM_{RPM}$ of the right traveling motor 36R. That is, since a rotation speed of the traveling motor opposite to a turn direction is faster, the deceleration threshold for the automatic deceleration, i.e., the left-turn threshold or the right-turn threshold, is determined based on a rotation speed of the traveling motor to smoothly achieve the automatic deceleration in correspondence to the left or right pivotal turn. In other words, the automatic deceleration can be prevented from being performed unintentionally at the time of left pivotal turn or right pivotal turn, so that the automatic deceleration can be performed only as necessary.

The controller 60 determines the left-turn threshold, i.e., the first left-turn threshold $ST1_L$ or the second left-turn threshold, $ST2_L$) which becomes lower as the second rotation speed $RM_{RPM}$ decrease, and which becomes higher as the second rotation speed $RM_{RPM}$ increases. Also, the controller 60 determines the right-turn threshold, i.e., the first right-turn threshold $ST1_R$ or the second right-turn threshold $ST2_R$, which becomes lower as the first rotation speed $LM_{RPM}$ decreases, and which becomes higher as the first rotation speed $LM_{RPM}$ increases. According to this configuration, the automatic deceleration can be performed smoothly in correspondence to the left or right pivotal turn. In other words, it is possible to suppress unintentional automatic deceleration at the time of left or right pivotal turn, and thus the automatic deceleration can be performed only as necessary.

The working machine 1 comprises the first circulation fluid line 57h connecting the left traveling pump 53L to the left traveling motor 36L and including the portion connected to the first port P11 of the left traveling motor 36L and the other portion connected to the second port P12 of the left traveling motor 36L, the second circulation fluid line 57*i* connecting the right traveling pump 53R to the right traveling motor 36R and including the portion connected to the third port P13 of the right traveling motor 36R and the other portion connected to the fourth port P14 of the right traveling motor 36R, the first pressure detector 80*a* provided on the portion of the first circulation fluid line 57*h* connected to the first port P11 of the left traveling motor 36L and configured to detect the first traveling pressure V1 that is the pressure of operation fluid applied to the portion of the first circulation fluid line 57*h* connected to the first port P11 of the left traveling motor P11 when rotating, the second pressure detector 80*b* provided on the portion of the first circulation fluid line 57*h* connected to the second port P12 of the left traveling motor 36L and configured to detect the second traveling pressure V2 that is the pressure of operation fluid applied to the portion of the first circulation fluid line 57*h* connected to the fourth port P12 of the left traveling motor 36L when rotating, the third pressure detector 80*c* provided on the portion of the second circulation fluid line 57*i* connected to the third port P13 of the right traveling motor 36R and configured to detect the third traveling pressure V3 that is the pressure of operation fluid applied to the portion of the second circulation fluid line 57*i* connected to the third port P13 of the right traveling motor 36R when rotating, and the fourth pressure detector 80*d* provided on the portion of the second circulation fluid line 57*i* connected to the fourth port P14 of the right traveling motor 36R and configured to detect the fourth traveling pressure V4 that is the pressure of operation fluid applied to the portion of the second circulation fluid line 57*i* connected to the fourth port P14 of the right traveling motor 36R when rotating. During left pivotal turn of the machine body 2, the controller 60 performs the automatic deceleration when the third traveling pressure V3 or the fourth traveling pressure V4 is equal to or higher than the left-turn threshold, i.e., the first left-turn threshold $ST1_L$. During right pivotal turn of the machine body 2, and the controller 60 performs the automatic deceleration when the first traveling pressure V1 or the second traveling pressure V2 is equal to or higher than the right-turn threshold, i.e., the first right-turn threshold STIR.

According to this configuration, in left pivotal turn of the machine body 2, the automatic deceleration can be performed when the traveling pressure, i.e., the third traveling pressure V3 or the fourth traveling pressure V4, reflecting the actual pressure condition of the right traveling motor 36R is equal to or higher than the left-turn threshold, i.e., the first left-turn threshold $ST1_L$. In addition, in right pivotal turn of the machine body 2, the automatic deceleration can be performed when the traveling pressure, i.e., the first traveling pressure V1 or the second traveling pressure V2, reflecting the actual pressure condition of the left traveling motor 36L is equal to or higher than the left-turn threshold, i.e., the first right-turn threshold $ST1_R$.

The controller 60 obtains the first differential pressure ΔV1 by subtracting the second traveling pressure V2 from the first differential pressure V1, obtains the second differential pressure ΔV2 by subtracting the first traveling pressure V1 from the second differential pressure V2, obtains the third differential pressure ΔV3 by subtracting the fourth traveling pressure V4 from the third differential pressure V3, and obtains the fourth differential pressure ΔV4 by subtracting the third traveling pressure V3 from the fourth differential pressure V4. When the machine body 2 pivotally turns left, the controller 60 performs the automatic deceleration when the third differential pressure ΔV3 or the fourth differential pressure ΔV4 is equal to or higher than the left-turn threshold, i.e., the second left-turn threshold $ST2_L$. When the machine body 2 pivotally turns right, the controller 60 performs the automatic deceleration when the first differential pressure ΔV1 or the second differential pressure ΔV2 is equal to or higher than the right-turn threshold, i.e., the second right-turn threshold $ST2_R$.

According to this configuration, in left pivotal turn of the machine body 2, the automatic deceleration can be performed when the effective traveling pressure, i.e., the third differential pressure ΔV3 or the fourth differential pressure ΔV4, reflecting the actual pressure condition of the right traveling motor 36R is equal to or higher than the left-turn threshold, i.e., the second left-turn threshold $ST2_L$. In addition, in right pivotal turn of the machine body 2, the automatic deceleration can be performed when the effective traveling pressure, i.e., the first differential pressure ΔV1 or the second differential pressure ΔV2, reflecting the actual pressure condition of the left traveling motor 36L is equal to or higher than the left-turn threshold, i.e., the second right-turn threshold $ST2_R$.

The controller 60 changes the left-turn threshold, i.e., the first left-turn threshold $ST1_L$ or the second left-turn threshold $ST2_L$, and the right-turn threshold, i.e., the first right-turn threshold $ST1_R$ or the second right-turn threshold $ST2_R$, according to a revolving speed of the prime mover 32. According to this configuration, the left-turn threshold and the right-turn threshold can be changed according to a revolving speed of the prime mover 32, which varies depending on a load of the prime mover 32, so that automatic deceleration can be performed in correspondence to variation of load.

The controller 60 determines the spin-turn thresholds (that is, the first spin-turn threshold $ST1_P$ and the second spin-turn threshold $ST2_P$) according to higher (faster) one of the first rotation speed $LM_{RPM}$ of the left traveling motor 36L and the second rotation speed $RM_{RPM}$ of the right traveling motor 36R. According to this configuration, in a case where the working machine 1 spins to turn, it is possible to appropriately judge whether to perform automatic deceleration based on the spin-turn threshold determined according to higher one of the rotation speeds $LM_{RPM}$ and $RM_{RPM}$ of the traveling motors 36L and 36R. Then, automatic deceleration can be performed smoothly at a suitable timing.

During spin-turn of the machine body 2, the controller 60 determines the spin-turn threshold, i.e., the first spin-turn threshold $ST1_P$ or the second spin-turn threshold $ST2_P$, as the deceleration threshold for judging whether to perform the automatic deceleration. The spin-turn threshold is lower than the left-turn threshold, i.e., the first left-turn threshold $ST1_L$ or the second left-turn threshold $ST2_L$, and the right-turn threshold, i.e., the first right-turn threshold $ST1_R$ or the second right-turn threshold $ST2_R$. According to this configuration, the automatic deceleration can be performed in spin turn of the working machine 1 quickly and smoothly than that in another typed turn such as the pivotal turn or a gentle turn.

When the machine body 2 spin-turns, the controller 60 performs the automatic deceleration when any one of the first traveling pressure V1, the second traveling pressure V2, the third traveling pressure V3, and the fourth traveling pressure V4 is equal to or higher than the spin-turn threshold, i.e., the first spin-turn threshold $ST1_P$. According to this configuration, it is possible to judge whether to perform the automatic deceleration at the time of spin-turn of the working machine 1 based on the first traveling pressure V1, the second traveling pressure V2, the third traveling pressure V3, and the fourth traveling pressure V4. In addition, the automatic deceleration can be performed only when any one of the first traveling pressure V1, the second traveling pressure V2, the third traveling pressure V3, and the fourth traveling pressure V4 is equal to or higher than the spin-turn threshold, i.e., the first spin-turn threshold $ST1_P$.

Alternatively, during spin-turn of the machine body 2, the controller 60 performs the automatic deceleration when any one of the first differential pressure ΔV1 obtained by subtracting the second traveling pressure V2 from the first traveling pressure V1, the second differential pressure ΔV2 obtained by subtracting the first traveling pressure V1 from the second traveling pressure V2, the third differential pressure ΔV3 obtained by subtracting the fourth traveling pressure V4 from the third traveling pressure V3, and the fourth differential pressure ΔV4 obtained by subtracting the third traveling pressure V3 from the fourth traveling pressure V4 is equal to or higher than the spin-turn threshold, i.e., the second spin-turn threshold $ST2_P$. According to this configuration, it is possible to judge whether to perform the automatic deceleration in spin-turn based on the first differential pressure ΔV1, second differential pressure ΔV2, third differential pressure ΔV3, and fourth differential pressure ΔV4. In addition, it is possible to perform the automatic deceleration only when one of the first differential pressure ΔV1, second differential pressure ΔV2, third differential pressure ΔV3, and fourth differential pressure ΔV4 is equal to or higher than the spin-turn threshold (that is, the second spin-turn threshold $ST2_P$).

The working machine 1 comprises the machine body 2, the left traveling device 5L provided on the left portion of the machine body 2, the right traveling device 5R provided on the right portion of the machine body 2, the left traveling motor 36L to output a power to the left traveling device 5L, the right traveling motor 36R to output a power to the right traveling device 5R, the first rotation detector 68a to detect the first rotation speed $LM_{RPM}$ that is the rotation speed of the left traveling motor 36L, the second rotation detector 68b to detect the second rotation speed $RM_{RPM}$ that is the rotation speed of the right traveling motor 36R, the left traveling pump 53L having the first pressure-receiving portion 53a and the second pressure-receiving portion 53b each of which receives a pressure of operation fluid, the left traveling pump 53L being configured to supply operation fluid to the left traveling motor 36L when the operation fluid is applied to at least one of the first pressure-receiving portion 53a and the second pressure-receiving portion 53b, the right traveling pump 53R having the third pressure-receiving portion 53a and the fourth pressure-receiving portion 53b each of which receives a pressure of operation fluid, the right traveling pump 53R being configured to supply operation fluid to the right traveling motor 36R when the operation fluid is applied to at least one of the third pressure-receiving portion 53a and the fourth pressure-receiving portion 53b, the traveling operation device 54 to be operated for traveling of the machine body 2, which applies operation fluid to any one of the first pressure-receiving portion 53a, the second pressure-receiving portion 53b, the third pressure-receiving portion 53c, and the fourth pressure-receiving portion 53d, based on an operational condition and thereby operates at least one of the left traveling pump 53L and the right traveling pump 53R, and the controller 60 to perform, when the first rotation speed $LM_{RPM}$ and the second rotation speed $RM_{RPM}$ are set at a second speed stage, automatic deceleration to automatically reduce the first rotation speed $LM_{RPM}$ and the second rotation speed $RM_{RPM}$ to the first speed stage lower than the second speed stage. During straight traveling of the machine body 2, the controller 60 determines, as the deceleration threshold for judging whether to perform the automatic deceleration, the straight-traveling threshold, i.e., the first straight traveling threshold $SF1_S$ or the second straight traveling threshold $SF2_S$, serving as the deceleration threshold for judging whether to perform the automatic deceleration, based on the rotation difference ΔMP between the first rotation speed $LM_{RPM}$ and the second rotation speed $RM_{RPM}$, based on the rotation ratio ΔDQ, or based on the rotation-ratio difference ΔDP.

For example, when the machine body 2 shifts from a state of pivotal turn to a state of straight traveling, there will be a difference between the first rotation speed $LM_{RPM}$ and the second rotation speed $RM_{RPM}$. In such a case, the machine body 2 can be kept traveling at the second speed stage by determining the straight traveling threshold (that is, first straight traveling threshold $SF1_S$ or the second straight traveling threshold $SF2_S$) according to the rotation difference ΔMP, the rotation ratio ΔDQ, or the rotation-ratio difference ΔDP That is, when the machine body 2 shifts from a state of pivot turn to a straight of straight traveling, automatic deceleration is not performed, and after straight traveling of the machine body 2 becomes stable, the automatic deceleration can be performed as necessary.

The controller 60 determines the straight-traveling threshold, i.e., the first straight-traveling threshold $SF1_S$ or the second straight-traveling threshold $SF2_S$, which becomes higher as the rotation difference ΔMP increases, and which becomes lower as the rotation difference ΔMP decreases. Therefore, the automatic deceleration is hardly performable when the machine body 2 is likely to pivotally turn (that is, when the rotation difference ΔMP is large), and the automatic deceleration is easily performable when of the machine body 2 is likely to travel straight (that is, when the rotation difference ΔMP is small).

The controller 60 determines the straight-traveling threshold, i.e., the first straight-traveling threshold $SF1_S$ or the second straight-traveling threshold $SF2_S$, which becomes higher as the rotation ratio ΔDQ or the rotation-ratio difference ΔDP increases, and which becomes lower as the rotation ratio ΔDQ or the rotation-ratio difference ΔDP decreases. Therefore, the automatic deceleration is hardly performable when the machine body 2 is likely to pivotally turn (that is, when the rotation ratio ΔDQ or the rotation-ratio difference ΔDP is large), and the automatic deceleration is easily performable when the machine body 2 is likely to travel straight (that is, when the rotation ratio ΔDQ or the rotation-ratio difference ΔDP is small).

The working machine 1 comprises the first circulation fluid line 57h connecting the left traveling pump 53L to the left traveling motor 36L, and including a portion connected to the first port P11 of the left traveling motor 36L and another portion connected to the second port P12 of the left traveling motor 36R, the second circulation fluid line 57i connecting the right traveling pump 53R to the right traveling motor 36R, and including a portion connected to the third port P13 of the right traveling motor 36R and another portion connected to the fourth port P14 of the right traveling motor 36R, the first pressure detector 80a provided on the portion of the first circulation fluid line 57h connected to the first port P11 of the left traveling motor 36L and configured to detect the first traveling pressure V1 that is the pressure of operation fluid applied to the portion of the first circulation fluid line 57h connected to the first port P11 of the left traveling motor 36L when rotating, the second pressure detector 80b provided on the portion of the first circulation fluid line 57h connected to the second port P12 of the left traveling motor 36L and configured to detect the second traveling pressure V2 that is the pressure of operation fluid applied to the portion of the first circulation fluid line 57h connected to the second port P12 of the left traveling motor 36L when rotating, the third pressure detector 80c provided on the portion of the second circulation fluid line 57i connected to the third port P13 of the right traveling motor 36R and configured to detect the third traveling pressure V3 that is the pressure of operation fluid applied to the portion of the second circulation fluid line 57i connected to the third port P13 of the right traveling motor 36R when rotating, and the fourth pressure detector 80d provided on the portion of the second circulation fluid line P14 connected to the fourth port P14 of the right traveling motor 36R and configured to detect the fourth traveling pressure V4 that is the pressure of operation fluid applied to the portion of the second circulation fluid line 57i connected to the fourth port P14 of the right traveling motor 36R when rotating. During straight forward traveling of the machine body 2, the controller 60 performs the automatic deceleration when either the first traveling pressure V1 or the third traveling pressure V3 is equal to or higher than the straight-traveling threshold, i.e., the first straight-traveling threshold $SF1_S$.

According to this configuration, when the machine body 2 travels forward, the automatic deceleration can be performed based on the traveling pressure reflecting the actual pressure condition of the left traveling motor 36L, i.e., the first traveling pressure V1, or the traveling pressure reflecting the actual pressure condition of the right traveling motor 36R, i.e., the third traveling pressure V3, when the traveling pressure is equal to or higher than the straight-traveling threshold, i.e., the first straight-traveling threshold $SF1_S$.

During straight forward traveling of the machine body 2, the controller 60 performs the automatic deceleration when either the first differential pressure ΔV1 obtained by subtracting the second traveling pressure V2 from the first traveling pressure V1 or the third differential pressure ΔV3 obtained by subtracting the fourth traveling pressure V4 from the third traveling pressure V3 is equal to or higher than the straight-traveling threshold, i.e., the second straight-traveling threshold $SF2_S$. According to this configuration, when the machine body 2 travels forward, the automatic deceleration can be performed based on the effective traveling pressure reflecting the actual pressure condition of the left traveling motor 36L, that is, the first differential pressure ΔV1, and the effective traveling pressure reflecting the actual pressure condition of the right traveling motor 36R, i.e., the third differential pressure ΔV3, when the effective traveling pressure is equal to or higher than the straight-traveling threshold, i.e., the second straight-traveling threshold $SF2_S$.

The working machine 1 comprises the machine body 2, the left traveling device 5L provided on the left portion of the machine body 2, the right traveling device 5R provided on the right portion of the machine body 2, the left traveling motor 36L to output a power to the left traveling device 5L, the right traveling motor 36R to output a power to the right traveling device 5R, the first rotation detector 68a to detect the first rotation speed $LM_{RPM}$ that is the rotation speed of the left traveling motor 36L, the second rotation detector 68b to detect the second rotation speed $RM_{RPM}$ that is the rotation speed of the right traveling motor 36R, the left traveling pump 53L to supply operation fluid to the left traveling motor 36L, the right traveling pump 53R to supply operation fluid to the right traveling motor 36R, the traveling operation device 54 to operate at least one of the left traveling pump 53L and the right traveling pump 53R, and the controller 60 to perform, when the first rotation speed $LM_{RPM}$ and the second rotation speed $RM_{RPM}$ are set at a second speed stage, automatic deceleration to automatically reduce the first rotation speed $LM_{RPM}$ and the second rotation speed $RM_{RPM}$ to the first speed stage lower than the second speed stage. During straight traveling of the machine body 2, the controller 60 determines the straight-traveling threshold, i.e., the first straight-traveling threshold $SF1_S$ or the second straight-traveling threshold $SF2_S$, serving as the deceleration threshold for judging whether to perform the automatic deceleration based on the first rotation speed $LM_{RPM}$ or the second rotation speed $RM_{RPM}$.

For example, when the working machine 1 accelerates from a state where a vehicle speed of the working machine 1 is low (slow), or when the working machine 1 accelerates from a stationary state, the first rotation speed $LM_{RPM}$ of the left traveling motor 36L and the second rotation speed $RM_{RPM}$ of the right traveling motor 36R increase (become higher). In this case, according to the present embodiment, since it is possible to determine whether or not to perform automatic deceleration with use of the straight-traveling threshold determined based on the first or second rotation speed $LM_{RPM}$ or $RM_{RPM}$, it is possible to suppress the automatic deceleration from being performed, and allow the working machine 1 to travel straight while accelerating smoothly. After the working machine 1 comes to stably travel straight, the working machine 1 can determine whether to start automatic deceleration with use of the straight-traveling threshold, thereby appropriately performing the automatic deceleration.

The controller 60 determines the straight-traveling threshold, i.e., the first straight-traveling threshold $SF1_S$ or the second straight-traveling threshold $SF2_S$, which becomes higher as the first rotation speed $LM_{RPM}$ or the second rotation speed $RM_{RPM}$ increases, and which becomes lower as the first rotation speed $LM_{RPM}$ or the second rotation speed $RM_{RPM}$ decreases. According to this configuration, when the working machine 1 accelerates from a state where the working machine 1 travels at a low (slow) speed, or when the working machine 1 accelerates from a stationary state, the automatic deceleration is suppressed, so that the automatic deceleration is allowed after straight traveling of the working machine 1 becomes stable.

The working machine 1 comprises the first circulation fluid line 57h connecting the left traveling pump 53L to the left traveling motor 36L, and including a portion connected to the first port P11 of the left traveling motor 36L and another portion connected to the second port P12 of the left traveling motor 36L, the second circulation fluid line 57i connecting the right traveling pump 53R to the right traveling motor 36R, and including a portion connected to the third port P13 of the right traveling motor 36R and another portion connected to the fourth port P14 of the right traveling motor 36R, the first pressure detector 80a provided on the portion of the first circulation fluid line 57h connected to the first port P11 of the left traveling motor 36L and configured to detect the first traveling pressure V1 that is the pressure of operation fluid applied to the portion of the first circulation fluid line 57h connected to the first port P11 of the left traveling motor 36L when rotating, the second pressure detector 80b provided on the portion of the first circulation fluid line 57h connected to the second port P12 of the left traveling motor 36L and configured to detect the second traveling pressure V2 that is the pressure of operation fluid applied to the portion of the first circulation fluid line 57h connected to the second port P12 of the left traveling motor 36L when rotating, the third pressure detector 80c provided on the portion of the second circulation fluid line 57i connected to the third port P13 of the right traveling motor 36R and configured to detect the third traveling pressure V3 that is the pressure of operation fluid applied to the portion of the second circulation fluid line 57i connected to the third port P13 of the right traveling motor 36R when rotating, and the fourth pressure detector 80d provided on the portion of the second circulation fluid line 57i connected to the fourth port P14 of the right traveling motor 36R and configured to detect the fourth traveling pressure V4 that is the pressure of operation fluid applied to the portion of the second circulation fluid line 57i connected to the fourth port P14 of the right traveling motor 36R when rotating. During straight forward traveling of the machine body 2, the controller 60 performs the automatic deceleration when both the first traveling pressure V1 and the third traveling pressure V3 are each kept equal to or higher than the straight-traveling threshold, i.e., the first straight-traveling threshold $SF1_S$, for a first judgment time or longer.

This allows automatic deceleration to be performed when a time elapsed when the traveling pressure corresponding to the left traveling motor 36L (that is, the first traveling pressure V1) and the traveling pressure corresponding to the right traveling motor 36R (that is, the third traveling pressure V3) are equal to or higher than the straight traveling threshold (that is, the first straight traveling threshold $SF1_S$) continues to be equal to or longer than the first judgment time in forward straight traveling of the working machine 1. That is, automatic deceleration can be performed when a state where the first traveling pressure V1 and the third traveling pressure V3 are equal to or higher than the straight traveling threshold (that is, the first straight traveling threshold $SF1_S$) continues for the first judgment time or longer.

The controller 60 determines the first judgment time which becomes shorter as the first rotation speed $LM_{RPM}$ or the second rotation speed $RM_{RPM}$ increases, and which becomes longer as the first rotation speed $LM_{RPM}$ or the second rotation speed $RM_{RPM}$ decreases. According to this configuration, when the first rotation speed $LM_{RPM}$ or the second rotation speed $RM_{RPM}$ is small and a vehicle speed (that is, a traveling speed) of the working machine 1 is slow, the first judgment time is determined to be long, so that automatic deceleration can be performed only when the vehicle speed is kept slow for a long time. On the other hand, when the first rotation speed $LM_{RPM}$ or the second rotation speed $RM_{RPM}$ is large and the vehicle speed (that is, the traveling speed) of the working machine 1 is high, the first judgment time is determined to be short, and accordingly automatic deceleration can be performed quickly.

During straight forward traveling of the machine body 2, the controller 60 performs the automatic deceleration when both the first differential pressure ΔV1 obtained by subtracting the second traveling pressure V2 from the first traveling pressure V1 and the third differential pressure ΔV3 obtained by subtracting the fourth traveling pressure V4 from the third traveling pressure V3 are each kept equal to or higher than the straight-traveling threshold, i.e., the second straight-traveling threshold $SF2_S$, for the second judgment time or longer. According to this configuration, when the machine body 2 moves forward, and when a time elapsed when the effective traveling pressure corresponding to the left traveling motor 36L (that is, the first differential pressure ΔV1) and the effective traveling pressure corresponding to the right traveling motor 36R (that is, the differential pressure ΔV3) are equal to or higher than the straight traveling threshold (that is, the second straight traveling threshold $SF2_S$) continues to be equal to or longer than the second judgment time, automatic deceleration can be performed. That is, automatic deceleration can be performed when both the first differential pressure ΔV1 that is the effective traveling pressure and the third differential pressure ΔV3 that is the effective traveling pressure are each kept equal to or higher than the straight traveling threshold, i.e., the second straight traveling threshold $SF2_S$, for the second judgment time or longer.

The controller 60 determines the second judgment time which becomes shorter as the first rotation speed $LM_{RPM}$ or the second rotation speed $RM_{RPM}$ increases, and which becomes longer as the first rotation speed $LM_{RPM}$ or the second rotation speed $RM_{RPM}$ decreases. According to this configuration, when the first rotation speed $LM_{RPM}$ or the second rotation speed $RM_{RPM}$ is small and a vehicle speed (that is, a traveling speed) of the working machine 1 is slow, the second judgment time is determined to be long, so that automatic deceleration can be performed only when the vehicle speed is slow continuously for a long time. On the other hand, when the first rotation speed $LM_{RPM}$ or the second rotation speed $RM_{RPM}$ is large and the vehicle speed of the working machine 1 is fast, the second judgment time is determined to be short, and thus automatic deceleration can be performed quickly.

The controller 60 does not perform automatic deceleration when the traveling operation member 59 included in the traveling operation device 54 is operated in the direction for forward traveling of the machine body 2 and the left traveling motor 36L and the right traveling motor 36R rotate in respective directions for backward traveling of the machine body 2. According to this configuration, when the traveling operation member 59 is instantaneously operated in a forward-traveling direction during the backward traveling of the working machine 1, automatic deceleration is not performed, thereby continuously stabilizing the backward traveling of the working machine 1.

The controller 60 does not perform the automatic deceleration when the first rotation speed $LM_{RPM}$ or the second rotation speed $RM_{RPM}$ is equal to or higher than a predetermined rotation speed. According to this configuration, when the first rotation speed $LM_{RPM}$ or the second rotation speed $RM_{RPM}$ is in a high-speed region, automatic deceleration is not performed, thereby facilitating work to be performed by the working machine 1.

The controller 60 does not perform the automatic deceleration when the first rotation speed $LM_{RPM}$ of the left traveling motor 36L is equal to or higher than the first maximum rotation speed of the left traveling motor 36L at the first speed stage or when the second rotation speed $RM_{RPM}$ of the right traveling motor 36R is equal to or higher than the second maximum rotation speed of the right traveling motor 36R at the first speed stage. According to this configuration, in a case where the traveling machine 1 is traveling to climb a slope under a state where the rotation speed of the left traveling motor 36L is determined at the second speed stage, the working machine 1 is capable of traveling without deteriorating traveling performance of the working machine 1 since the automatic deceleration is not performed when the rotation speeds of the traveling motors 36L and 36R are high.

The controller 60 determines the straight traveling threshold, that is, the first straight-traveling threshold $SF1_S$ or the second straight-traveling threshold $SF2_S$, when the traveling operation member 59 included in the traveling operation device 54 is operated in the direction for forward traveling of the machine body 2. This makes it possible to determine the straight-traveling threshold according to an operational condition of the traveling operation member 59 and a traveling condition of the machine body 2, and to perform automatic deceleration smoothly and appropriately based on the straight-traveling thresholds.

The working machine 1 comprises the machine body 2, the left traveling device 5L provided on the left portion of the machine body 2, the right traveling device 5R provided on the right portion of the machine body 2, the left traveling motor 36L to output a power to the left traveling device 5L, the power output from the left traveling motor 36L having the first rotation speed $LM_{RPM}$ set in a speed stage shiftable between the first speed stage and the second speed stage higher than the first speed stage, the right traveling motor 36R to output a power to the right traveling device 5R, the power output from the left traveling motor 36L having the second rotation speed $RM_{RPM}$ set in a speed stage shiftable between the first speed stage and the second speed stage higher than the first speed stage, the first rotation detector 68a to detect the first rotation speed $LM_{RPM}$ of the left traveling motor 36L, the second rotation detector 68b to detect the second rotation speed $RM_{RPM}$ of the right traveling motor 36R, the left traveling pump 53L to supply operation fluid to the left traveling motor 36L, the right traveling pump 53R to supply operation fluid to the right traveling motor 36R, the traveling operation device 54 to operate at least one of the left traveling pump 53L and the right traveling pump 53R, and the controller 60 to perform automatic deceleration to automatically reduce the first rotation speed $LM_{RPM}$ and the second rotation speed $RM_{RPM}$ both set at the respective second speed stages by shifting the speed stage of each of the first rotation speed $LM_{RPM}$ and the second rotation speed $RM_{RPM}$ from the second speed stage to the first speed stage. The controller 60 does not perform the automatic deceleration when the traveling operation member 59 included in the traveling operation device 54 is operated in the direction for forward traveling of the machine body 2 and the left and right traveling motors 36L and 36R rotate in the respective directions for backward traveling of the machine body 2. According to this configuration, even when the traveling operation member 59 is quickly operated in a direction corresponding to forward traveling under a state where the machine body 2 is traveling backward, automatic deceleration is not performed, and thus the working machine 1 can be traveling backward stably.

The working machine 1 comprises the machine body 2, the left traveling device 5L provided on the left portion of the machine body 2, the right traveling device 5R provided on the right portion of the machine body 2, the left traveling motor 36L to output a power to the left traveling device 5L, the power output from the left traveling motor 36L having the first rotation speed $LM_{RPM}$ set at a speed stage shiftable between the first speed stage and the second speed stage higher than the first speed stage, the right traveling motor 36R to output a power to the right traveling device 5R, the power output from the right traveling motor 36R having the second rotation speed $RM_{RPM}$ set at a speed stage shiftable between the first speed stage and the second speed stage higher than the first speed stage, the first rotation detector 68a to detect the first rotation speed $LM_{RPM}$ of the left traveling motor 36L, the second rotation detector 68b to detect the second rotation speed $RM_{RPM}$ of the right traveling motor 36R, the left traveling pump 53L to supply operation fluid to the left traveling motor 36L, the right traveling pump 53R to supply operation fluid to the right traveling motor 36R, the traveling operation device 54 to operate at least one of the left traveling pump 53L and the right traveling pump 53R, and the controller 60 to perform automatic deceleration to automatically reduce the first rotation speed $LM_{RPM}$ and the second rotation speed $RM_{RPM}$ by shifting the speed stage of each of the first rotation speed $LM_{RPM}$ and the second rotation speed $RM_{RPM}$ from the second speed stage to the first speed stage. The controller 60 does not perform the automatic deceleration when the first rotation speed $LM_{RPM}$ or the second rotation speed $RM_{RPM}$ is equal to or higher than a predetermined rotation speed. According to this configuration, the automatic deceleration is not performed when the first rotation speed $LM_{RPM}$ and the second rotation speed $RM_{RPM}$ are in a high-speed region, thereby facilitating work to be performed by the working machine 1.

In the above-mentioned embodiment, the left traveling motor 36L and the right traveling motor 36R are configured to simultaneously switch to the first speed stage or the second speed stage, and automatic deceleration is also performed simultaneously to the left traveling motor 36L and the right traveling motor 36R. Accordingly, the left traveling motor 36L and the right traveling motor 36R may be configured to independently switch to the first speed stage or the second speed stage. The automatic deceleration may be performed with at least one of the left traveling motor 36L and the right traveling motor 36R switched to the second speed stage. Furthermore, the switchable speed stages of the left traveling motor 36L and the right traveling motor 36R may not be limited to two, but be three or more.

In addition, the traveling motors 36L and 36R may be axial piston motors or radial piston motors. Regardless of whether the traveling motors 36L and 36R are radial piston motors or radial piston motors, when a pressure of operation fluid supplied to the motors becomes high, each of rotation speeds of the traveling motors can be set at the first speed stage, and when the pressure of operation fluid supplied to the motors becomes low, each of the rotation speeds of the traveling motors can be switched to the second speed stage.

In the above-mentioned embodiment, the straight-traveling threshold, i.e., the first straight-traveling threshold $SF1_S$ or the second straight-traveling threshold $SF2_S$, is determined based on the rotation speeds (that is, the first rotation speed $LM_{RPM}$ and the second rotation speed $RM_{RPM}$), rotation ratio difference $\Delta DP$, or rotation ratio $\Delta DQ$ of the traveling motors (that is, the left traveling motor 36L and the right traveling motor 36R). Accordingly, the straight-traveling thresholds (that is, the first straight-traveling threshold $SF1_S$ and the second straight-traveling threshold $SF2_S$) may be determined, for example, according to change in the rotation speeds (that is, rotation-speed changing amounts) of the traveling motors (that is, the left traveling motor 36L and the right traveling motor 36R).

For example, as shown in FIG. 10A, the controller 60 determines the straight-traveling threshold, i.e., the first straight-traveling threshold $SF1_S$ or the second straight-traveling threshold $SF2_S$, which becomes lower as rotation-speed variation amounts of the traveling motors 36L and 36R increase, and which becomes higher as the rotation-speed variation amounts of the traveling motors 36L and 36R decrease. That is, as shown in FIG. 10A, the controller 60 determines the first straight-traveling threshold $SF1_S$ and the second straight-traveling threshold $SF2_S$ by applying the actually detected rotation-speed changing amounts of the traveling motors 36L and 36R to the lines L13 and L14 representing relationships between the straight-traveling thresholds $SF1_S$ and $SF2_S$ and the rotation-speed changing amounts of the traveling motors 36L and 36R.

The rotation-speed variation amounts of the traveling motors 36L and 36R each means the amount of variation, i.e., increase or decrease, per predetermined time in rotation speed of each of the left traveling motor 36L and the right traveling motor 36R. Specifically, for example, the rotation-speed variation amount of the left traveling motor 36L is a difference between a rotation speed of the left traveling motor 36L at a certain time and another rotation speed of the left traveling motor 36L at a time before the certain time. In addition, the rotation-speed variation amount of the right traveling motor 36R is a difference between a rotation speed of the right traveling motor 36R at a certain time and another rotation speed of the right traveling motor 36R at a time before the certain time.

In the example shown in FIG. 10A, on the horizontal axis, increasing amounts in positive (+) of the rotation-speed variation amounts of the traveling motors 36L and 36R become larger as shifting to the left and becomes smaller as shifting to the right. The right side to the zero value (not shown in the drawings) on the horizontal axis indicates decreasing amounts in negative (−) of the rotation-speed variation amounts of the traveling motors 36L and 36R, and the decreasing amounts becomes larger as shifting to the right.

The controller 60, for example, utilizes the control data representing the lines L13 and L14 shown in FIG. 10A to determine the first straight-traveling threshold $SF1_S$ and the second straight-traveling threshold $SF2_S$ when the traveling operation member 59 is operated to have a condition to make the machine body 2 travel straight.

As another example, rates of change (that is, derivative values) of the rotation speeds of the traveling motors 36L and 36R for a predetermined time or an average value of the rotation speeds of the traveling motors 36L and 36R for a predetermined time may be used after the controller 60 calculates the rotation-speed changing amounts of the traveling motors 36L and 36R.

In the above-described embodiment, the straight-traveling thresholds (that is, the first straight-traveling threshold $SF1_S$ and the second straight-traveling threshold $SF2_S$) are determined based on the rotation speeds $LM_{RPM}$ and $RM_{RPM}$ of the traveling motors 36L and 36R; however, the straight-traveling thresholds may be determined based on an acceleration or speed of the working machine 1. In this case, the working machine 1 may have an acceleration sensor to detect the acceleration of the working machine 1 or a speed sensor to detect a vehicle speed of the working machine 1. Then, for example, as shown in FIG. 10B, the controller 60 determines the straight-traveling threshold, i.e., the first straight-traveling threshold $SF1_S$ or the second straight-traveling threshold $SF2_S$, which becomes lower as the acceleration or speed of the working machine 1 increases, and which becomes higher as the acceleration or speed of the working machine 1 decreases.

That is, as shown in FIG. 10B, the controller 60 may determine the first straight-traveling threshold $SF1_S$ and the second straight-traveling threshold $SF2_S$ by applying an actually detected acceleration or speed of the working machine 1 to the lines L15 and L16 representing relationships between the straight-traveling thresholds $SF1_S$ and $SF2_S$ and the acceleration or speed of the working machine 1. On the horizontal axis of FIG. 10B, the acceleration becomes larger toward the left (in acceleration) and smaller toward the right. The acceleration becomes a negative value (in deceleration) when shifting to the right respective to the zero value (not shown in the drawings) on the right side. The speed becomes larger as shifting to the left, and becomes smaller as shifting to the right. The speed also becomes a negative value when shifting to the right respective to the zero value (not shown in the drawings) on the right side. The controller 60 may utilize the control data representing the lines L15 and L16 shown in FIG. 10B to determine the first straight-traveling threshold $SF1_S$ and the second straight-traveling threshold $SF2_S$ when the traveling operation member 59 is operated to have a condition to make the machine body 2 travel forward. In this case, the "acceleration of the working machine 1" or the "vehicle speed" may be used instead of the "first rotation speed $LM_{RPM}$" and the "second rotation speed $RM_{RPM}$" of the above-described embodiment.

The above embodiment describes an example in which the rotation speeds $LM_{RPM}$ and $RM_{RPM}$ of the traveling motors 36L and 36R are detected by the rotation detectors 68a and 68b; instead, for example, an angle sensor may be provided to detect the angles of swash plates of the traveling pumps 53L and 53R that output the traveling motors 36L and 36, and the controller 60 may calculate the rotation speeds of traveling motors 36L and 36R based on an output of the angle sensor. In detail, since the rotation speeds of the traveling motors 36L and 36R and the angles of the swash plates of the traveling pumps 53L and 53R are in proportional relationship, the control data such as calculation formulas or tables representing the proportional relationship is stored in an internal memory of the controller 60 in advance, and the controller 60 calculates the rotation speeds of the traveling motors 36L and 36R based on the control data and the angles of swash plates of the traveling pumps 53L and 53R detected by the angle sensor.

In the above-described embodiment, the controller 60 determines the spin-turn thresholds (that is, the first spin-turn threshold $ST1_P$ and the second spin-turn threshold $ST2_P$), which are the deceleration thresholds for spin turn of the machine body 2, which become lower than the left-turn thresholds $ST1_L$ and $ST2_L$ and the right-turn thresholds $ST1_R$ and $ST2_R$ for pivotal turn of the machine body 2. Thus, for example, as shown in FIGS. 11A and 11B, the controller 60 determines the first spin-turn threshold $ST1_P$ and the second spin-turn threshold $ST2_P$ by applying the actually detected rotational speeds $LM_{RPM}$ and $RM_{RPM}$ of the traveling motors 36L and 36R to lines L17, L18, L19, and L20 representing relationships between the first and second spin-turn thresholds $ST1_P$ and $ST2_P$ and the rotation speeds of the traveling motors 36L and 36R (that is, the first rotation speed $LM_{RPM}$ and the second rotation speed $RM_{RPM}$).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
a left traveling device provided on a left portion of the machine body;
a right traveling device provided on a right portion of the machine body;
a left traveling motor to output a power to the left traveling device;
a right traveling motor to output a power to the right traveling device;

a first rotation detector to detect a first rotation speed that is a rotation speed of the left traveling motor;

a second rotation detector to detect a second rotation speed that is a rotation speed of the right traveling motor;

a left traveling pump to supply operation fluid to the left traveling motor;

a right traveling pump to supply operation fluid to the right traveling motor;

a traveling operation device to operate at least one of the left traveling pump and the right traveling pump; and a controller to perform, when the first rotation speed and the second rotation speed are set at a second speed stage, automatic deceleration to automatically reduce the first rotation speed and the second rotation speed to a first speed stage lower than the second speed stage, wherein during straight traveling of the machine body, the controller determines a straight-traveling threshold serving as a deceleration threshold for judging whether to perform the automatic deceleration based on the first rotation speed or the second rotation speed.

2. The working machine according to claim 1, wherein the controller determines the straight-traveling threshold which becomes higher as the first rotation speed or the second rotation speed increases, and which becomes lower as the first rotation speed or the second rotation speed decreases.

3. The working machine according to claim 1, comprising:

a first circulation fluid line connecting the left traveling pump to the left traveling motor and including a portion connected to a first port of the left traveling motor and another portion connected to a second port of the left traveling motor;

a second circulation fluid line connecting the right traveling pump to the right traveling motor and including a portion connected to a third port of the right traveling motor and another portion connected to a fourth port of the right traveling motor;

a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;

a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;

a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating, wherein during straight forward traveling of the machine body, the controller performs the automatic deceleration when both the first traveling pressure and the third traveling pressure are each kept equal to or higher than the straight-traveling threshold for a first judgment time or longer.

4. The working machine according to claim 2, comprising:

a first circulation fluid line connecting the left traveling pump to the left traveling motor and including a portion connected to a first port of the left traveling motor and another portion connected to a second port of the left traveling motor;

a second circulation fluid line connecting the right traveling pump to the right traveling motor and including a portion connected to a third port of the right traveling motor and another portion connected to a fourth port of the right traveling motor;

a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;

a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;

a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and a fourth pressure detector provided on the portion of the second circulation fluid line connected to the fourth port of the right traveling motor and configured to detect a fourth traveling pressure that is a pressure of operation fluid applied to the fourth port of the second circulation fluid line connected to the fourth port of the right traveling motor when rotating, wherein during straight forward traveling of the machine body, the controller performs the automatic deceleration when both the first traveling pressure and the third traveling pressure are each kept equal to or higher than the straight-traveling threshold for a first judgment time or longer.

5. The working machine according to claim 3, wherein the controller determines the first judgment time which becomes shorter as the first rotation speed or the second rotation speed increases, and which becomes longer as the first rotation speed or the second rotation speed decreases.

6. The working machine according to claim 4, wherein the controller determines the first judgment time which becomes shorter as the first rotation speed or the second rotation speed increases, and which becomes longer as the first rotation speed or the second rotation speed decreases.

7. The working machine according to claim 1, comprising:
- a first circulation fluid line connecting the left traveling pump to the left traveling motor and including a portion connected to a first port of the left traveling motor, and another portion connected to a second port of the left traveling motor;
- a second circulation fluid line connecting the right traveling pump to the right traveling motor and including a portion connected to a third port of the right traveling motor, and another portion connected to a fourth port of the right traveling motor;
- a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;
- a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;
- a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and
- a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating, wherein
- during straight forward traveling of the machine body, the controller performs the automatic deceleration when both a first differential pressure obtained by subtracting the second traveling pressure from the first traveling pressure and a third differential pressure obtained by subtracting the fourth traveling pressure from the third traveling pressure are each kept equal to or higher than the straight-traveling threshold for a second judgment time or longer.

8. The working machine according to claim 2, comprising:
- a first circulation fluid line connecting the left traveling pump to the left traveling motor and including a portion connected to a first port of the left traveling motor, and another portion connected to a second port of the left traveling motor;
- a second circulation fluid line connecting the right traveling pump to the right traveling motor and including a portion connected to a third port of the right traveling motor, and another portion connected to a fourth port of the right traveling motor;
- a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;
- a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;
- a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and
- a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating, wherein
- during straight forward traveling of the machine body, the controller performs the automatic deceleration when both a first differential pressure obtained by subtracting the second traveling pressure from the first traveling pressure and a third differential pressure obtained by subtracting the fourth traveling pressure from the third traveling pressure are each kept equal to or higher than the straight-traveling threshold for a second judgment time or longer.

9. The working machine according to claim 7, wherein the controller determines the second judgment time which becomes shorter as the first rotation speed or the second rotation speed increases, and which becomes longer as the first rotation speed or the second rotation speed decreases.

10. The working machine according to claim 8, wherein the controller determines the second judgment time which becomes shorter as the first rotation speed or the second rotation speed increases, and which becomes longer as the first rotation speed or the second rotation speed decreases.

11. The working machine according to claim 1, wherein the controller does not perform the automatic deceleration when a traveling operation member included in the traveling operation device is operated in a direction for forward traveling of the machine body and the left traveling motor and the right traveling motor rotate in respective directions for backward traveling of the machine body.

12. The working machine according to claim 1, wherein the controller does not perform the automatic deceleration when the first rotation speed or the second rotation speed is equal to or more than a predetermined speed.

13. The working machine according to claim 10, wherein the controller does not perform the automatic deceleration when the first rotation speed of the left traveling motor is equal to or higher than a first maximum rotation speed of the left traveling motor set at the first speed stage or when the second rotation speed of the right traveling motor is equal to or higher than a second maximum rotation speed of the right traveling motor set at the first speed stage.

14. The working machine according to claim 1, wherein the controller determines the straight-traveling threshold when a traveling operation member included in the traveling operation device is operated in a direction for straight traveling of the machine body.

15. A working machine comprising:
a machine body;
a left traveling device provided on a left portion of the machine body;
a right traveling device provided on a right portion of the machine body;
a left traveling motor to output a power to the left traveling device;
a right traveling motor to output a power to the right traveling device;
a first rotation detector to detect a first rotation speed that is a rotation speed of the left traveling motor;
a second rotation detector to detect a second rotation speed that is a rotation speed of the right traveling motor;
a left traveling pump to supply operation fluid to the left traveling motor;
a right traveling pump to supply operation fluid to the right traveling motor;
a traveling operation device to operate at least one of the left traveling pump and the right traveling pump; and
a controller to perform, when the first rotation speed and the second rotation speed are set at a second speed stage, automatic deceleration to automatically reduce the first rotation speed and the second rotation speed to a first speed stage lower than the second speed stage, wherein
during straight traveling of the machine body, the controller determines a straight-traveling threshold serving as a deceleration threshold for judging whether to perform the automatic deceleration based on a rotation difference or rotation ratio between the first rotation speed and the second rotation speed.

16. The working machine according to claim 15, wherein the controller determines the straight-traveling threshold which becomes higher as the rotation difference increases, and which becomes lower as the rotation difference decreases.

17. The working machine according to claim 15, wherein the controller determines the straight-traveling threshold which becomes higher as the rotation ratio increases, and which becomes lower as the rotation ratio decreases.

18. The working machine according to claim 15, wherein the controller determines the straight-traveling threshold which becomes higher as a difference between a first ratio obtained by dividing the second rotation speed by the first rotation speed and a second ratio obtained by dividing the first rotation speed by the second rotation speed becomes larger, and which becomes lower as the difference between the first ratio and the second ratio becomes smaller.

19. The working machine according to claim 15, comprising:
a first circulation fluid line connecting the left traveling pump to the left traveling motor and including a portion connected to a first port of the left traveling motor and another portion connected to a second port of the left traveling motor;
a second circulation fluid line connecting the right traveling pump to the right traveling motor and including a portion connected to a third port of the right traveling motor and another portion connected to a fourth port of the right traveling motor;
a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;
a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;
a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and
a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating, wherein
during straight forward traveling of the machine body, the controller performs the automatic deceleration when either one of the first traveling pressure and the third traveling pressure is equal to or more than the straight-traveling threshold.

20. The working machine according to claim 15, comprising:
a first circulation fluid line connecting the left traveling pump to the left traveling motor and including a portion connected to a first port of the left traveling motor, and another portion connected to a second port of the left traveling motor;
a second circulation fluid line connecting the right traveling pump to the right traveling motor and including a portion connected to a third port of the right traveling motor, and another portion connected to a fourth port of the right traveling motor;
a first pressure detector provided on the portion of the first circulation fluid line connected to the first port of the left traveling motor and configured to detect a first traveling pressure that is a pressure of operation fluid applied to the portion of the first circulation fluid line connected to the first port of the left traveling motor when rotating;
a second pressure detector provided on the portion of the first circulation fluid line connected to the second port of the left traveling motor and configured to detect a second traveling pressure that is a pressure of operation fluid applied to the portion of the first circulation fluid line connected to the second port of the left traveling motor when rotating;
a third pressure detector provided on the portion of the second circulation fluid line connected to the third port of the right traveling motor and configured to detect a third traveling pressure that is a pressure of operation fluid applied to the portion of the second circulation fluid line connected to the third port of the right traveling motor when rotating; and a fourth pressure detector provided on the portion of the second circulation fluid line connected to the fourth port of the right traveling motor and configured to detect a fourth traveling pressure that is a pressure of operation fluid applied to the portion of the second circulation fluid line connected to the fourth port of the right traveling motor when rotating, wherein during straight forward traveling of the machine body, the controller performs the automatic deceleration when either one of a first differential pressure obtained by subtracting the second traveling pressure from the first traveling pressure and a third differential pressure obtained by subtracting the fourth traveling pressure from the third traveling pressure is equal to or more than the straight-traveling threshold.

* * * * *